(12) United States Patent
Roedel et al.

(10) Patent No.: US 11,711,229 B2
(45) Date of Patent: *Jul. 25, 2023

(54) TRANSITION TO MESSAGING FROM TRANSCRIPTION AND CAPTIONING

(71) Applicant: MICROSOFT TECHNOLOGY LICENSING, LLC, Redmond, WA (US)

(72) Inventors: Dominic Roedel, Prague (CZ); Ondrej Zacek, Prague (CZ); Milica Jovanovic, Prague (CZ)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/840,950

(22) Filed: Jun. 15, 2022

(65) Prior Publication Data

US 2022/0407733 A1 Dec. 22, 2022

Related U.S. Application Data

(63) Continuation of application No. 17/349,836, filed on Jun. 16, 2021, now Pat. No. 11,394,569.

(51) Int. Cl.
| | | |
|---|---|---|
| *H04L 12/18* | (2006.01) | |
| *G06F 3/0482* | (2013.01) | |
| *H04L 51/046* | (2022.01) | |
| *G06F 3/04812* | (2022.01) | |

(52) U.S. Cl.
CPC ........ *H04L 12/1822* (2013.01); *G06F 3/0482* (2013.01); *G06F 3/04812* (2013.01); *H04L 12/1831* (2013.01); *H04L 51/046* (2013.01)

(58) Field of Classification Search
CPC ............. H04L 12/1822; H04L 12/1831; H04L 51/046; G06F 3/04812; G06F 3/0482
See application file for complete search history.

(56) References Cited

U.S. PATENT DOCUMENTS

| | | | |
|---|---|---|---|
| 9,652,113 B1* | 5/2017 | Colson | G06Q 10/1095 |
| 10,819,532 B1* | 10/2020 | van Rensburg | H04L 51/216 |
| 2008/0082619 A1 | 4/2008 | Wanderski et al. | |
| 2018/0205690 A1 | 7/2018 | Lan et al. | |
| 2020/0336794 A1 | 10/2020 | Fels et al. | |
| 2021/0409462 A1* | 12/2021 | Dusad | H04L 12/1822 |

OTHER PUBLICATIONS

"International Search Report and Written Opinion Issued in PCT Application No. PCT/US22/028877", dated Aug. 24, 2022, 11 Pages.

\* cited by examiner

*Primary Examiner* — Nazia Naoreen

(74) *Attorney, Agent, or Firm* — Newport IP, LLC; Han K. Gim

(57) ABSTRACT

The techniques disclosed herein improve existing systems by controlling a data processing system for generating messages associated with a communication session. A first UI is rendered on a user device that includes a text-based transcription or caption of dialogue being communicated between users of the communication session. In response to receiving a selection of a portion of the transcription or caption for corresponding via a messaging function of the communication session, rendering a second UI including the selected portion and current messages exchanged between the users of the communication session. The selected portion is rendered along with subsequent messages exchanged between the users of the communication session.

20 Claims, 20 Drawing Sheets

TRANSITION TO MESSAGING FROM TRANSCRIPTION AND CAPTIONING

CROSS-REFERENCE TO RELATED APPLICATION

This application is a continuation of U.S. patent application Ser. No. 17/349,836, filed Jun. 16, 2021, the content of which application is hereby expressly incorporated herein by reference in its entirety.

BACKGROUND

There are a number of systems and applications that provide features that assist users with communications features on their devices. For example, some systems allow users to communicate and collaborate using live video streams, live audio streams, and other forms of real-time, text-based, or image-based applications. Such activities may also be recorded for subsequent access.

The meeting chat of an online communications system is typically used for the efficient exchange of ideas and messages pertaining to the topic/agenda of the meeting among meeting participants in the form of direct or side conversations, which may further include the exchange of files, images and other rich collaborative and interactive objects. The online communications system may also provide transcriptions of the meeting and/or live captioning of the audio communications. Often, the meeting participants may want to share a specific piece of information/message from a transcription or caption with those who are participating in a chat session. However, the communications system may not readily allow the meeting organizer/participants to share information from a transcription or caption to the chat session without having to take a number of actions to switch between modes and share the relevant information between modes.

Systems that do not readily enable such users to share and discuss such information can cause a number of issues and negatively impact the effectiveness of a communication system in such scenarios. Computing devices that do not facilitate the use of such features can lead to production loss and inefficiencies with respect to a number of computing resources. For instance, participants of a communication session, such as an online meeting, may need to interrupt current collaboration activities in order to pursue a desired discussion in the chat session. This can lead to fragmented conversations, loss of continuity, and disruption of productivity. Content may need to be re-sent when participants miss salient points or cues during the interruption. Such activities can lead to inefficient use of network, processor, memory, or other computing resources. Also, when a participant's level of engagement is negatively impacted during a meeting, loss of production may cause a need for prolonged meetings or follow-up meetings, which in turn take additional computing resources. Such inefficiencies can be exacerbated when a system is used to provide a collaborative environment for a large number of participants.

Such drawbacks of existing systems can lead to loss of productivity, reduced security, and the inefficient use of computing resources.

SUMMARY

The techniques disclosed herein provide users with a way to quote, initiate, and reply using a chat messaging function based on a transcription or caption provided in a communications session. In existing online meeting solutions, users can participate in a number of ways. This includes the use of audio communications, video communications, and chat messages to express opinions and share information. While audio and video communications provide synchronous ways to participate in near real-time, messaging in the chat function is time delayed and operates in a more asynchronous fashion. Thus, the chat session is typically used as an asynchronous way to comment on matters without disrupting the on-going meeting. This can sometimes lead to chat messages in the chat thread to appear out of context as messages may not include contextual references. For example, a message may not refer to other comments in the thread but rather to a comment in the audio or video conversation.

The disclosure describes various embodiments for replying to/quoting an online meeting audio/video conversation with a chat message using the meeting transcription or caption function, thus allowing for a way to shift communications modalities in a communication session in a seamless and efficient manner.

In one embodiment, a participant of a communication session may initiate a chat with selected quotes or excerpts from a first dimension/modality (captions or transcripts) to a second dimension/modality (chat with a selected quote or portion of a transcript/caption quoted). In one embodiment, the reply to/quoting the online meeting audio/video conversation with the chat message may be initiated from a current live communications session. In some embodiments, the reply to/quoting the online meeting audio/video conversation with the chat message may be initiated after the communications session, from captions or transcripts that are accessible from the saved meeting data. For example, information for a past meeting may continue to be available to meeting participants or other authorized persons, who may access or generate meeting captions or transcripts for the past meeting. Additionally, some functions such as chat messages may continue to be utilized for on-going discussions by meeting participants after the live session has ended. The present disclosure provides a way to efficiently reply to/quote directly from captions or transcripts when continuing such on-going chat sessions. The described techniques allow for the efficient and direct composition of chat messages that include the context of an audio or video conversation in a way that text comments clearly relate to the relevant discussion in the meeting.

The present disclosure also describes the underlying architecture, systems, and data objects that support the described messaging functionality. In some embodiments, such a data object can be a multi-dimensional data structure that tracks on a per-chat or per-message basis. The data structure may include a dimension where each individual message is associated with users and respective transcripts or captions for the users, thereby providing granular control of users, data, and permissions on a per-message basis.

The techniques described above can lead to more efficient use of computing resources. In particular, by automating a process for reply to/quote directly from captions or transcripts, user interaction with the computing device can be improved. The techniques disclosed herein can lead to a more efficient use of computing resources by eliminating the need for a person to perform a number of manual steps to search, discover, review, display, select, and enter text in order to reply to/quote from captions or transcripts. The reduction of manual processes can lead to fewer inadvertent inputs and errors. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. References made to individual items of a plurality of items can use a reference number with a letter of a sequence of letters to refer to each individual item. Generic references to the items may use the specific reference number without the sequence of letters. The same reference numbers in different figures indicate similar or identical items.

DETAILED DESCRIPTION

Figure 1:
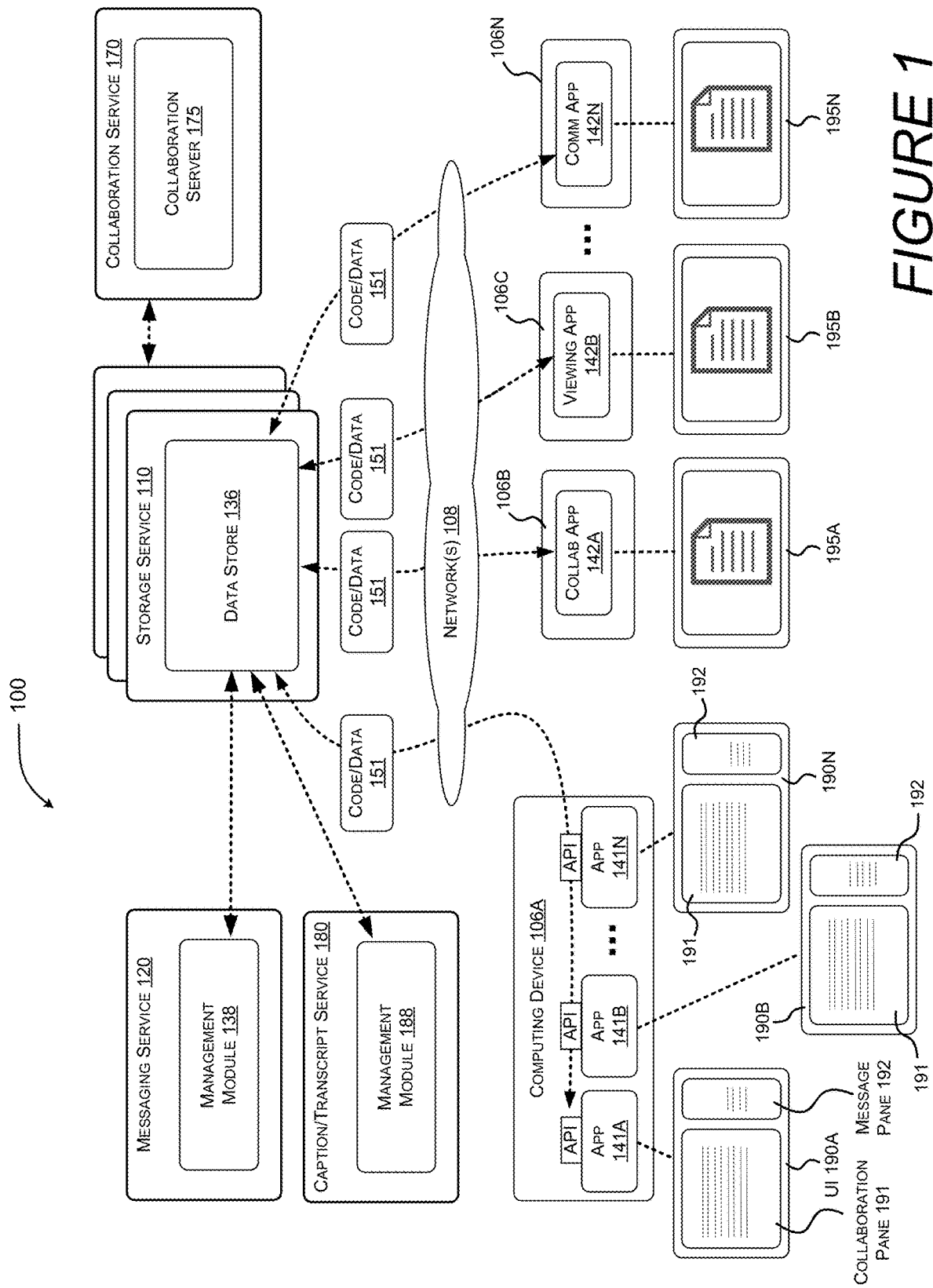
FIG. 1 illustrates aspects of a system for allowing reply to/quote directly from captions or transcripts.

The techniques disclosed herein provide systems with a way to allow the composition of chat messages in context of a past or ongoing audio/video conversation to ensure that the chat messages clearly relate to the actual discussion in the audio/video conversation.

The meeting chat of an online collaboration session is typically used for the quick exchange of ideas and messages pertaining to the topic/agenda of the meeting between meeting participants in various forms of direct and side conversations, and the sharing of files, images and other rich collaborative and interactive objects. Often, the meeting participants may want to consult or share a specific piece of information or a particular message with others, either to obtain their input or to share a piece of information with them. However, participants may want to avoid interrupting the current discussion, and the use of the chat function can provide a way to contribute to the meeting or indirectly participate in the discussion without interrupting the current discussion.

In many systems, the only way to input a comment based on an audio/video conversation into the chat function is to copy and paste from the transcript or otherwise manually enter the relevant conversation information. This can result in a comment in the chat session that may be out of context of the current chat, which can lead to fragmented or out-of-context conversations, which mitigates the advantages of having a collaboration session in the meeting chat with all the meeting related content in one place. New chats/conversations may lose aspects of the meeting context. A centralized and comprehensive meeting space is one objective of many collaborative platforms.

The present disclosure provides a way to quote, initiate, and reply using a chat messaging function based on a transcription or caption provided in a communications session. Existing online meeting solutions allow users to participate in a number of ways. This includes the use of audio communications, video communications, and chat messages to express opinions and share information. While audio and video communications provide synchronous ways to participate in near real-time, messaging in the chat function is often time delayed due to efforts required to generate the messages, and thus operates in a more asynchronous fashion. Thus, the chat session is typically used as an asynchronous way to comment on matters without disrupting the on-going meeting. This can sometimes lead to chat messages in the chat thread to appear out of context as messages may not include contextual references. For example, a message may not refer to other comments in the thread but rather to a comment in the audio or video conversation.

The disclosure describes various embodiments for replying to/quoting an online meeting audio/video conversation with a chat message using the meeting transcription or caption function, thus allowing for a way to shift communications modalities in a communication session in a seamless and efficient manner.

In one embodiment, a participant of a communication session may initiate a chat with selected quotes or excerpts from a first dimension/modality (captions or transcripts) to a second dimension/modality (chat with a selected quote or portion of a transcript/caption quoted). In one embodiment, the reply to/quoting the online meeting audio/video conversation with the chat message may be initiated from a current live communications session. In some embodiments, the reply to/quoting the online meeting audio/video conversation with the chat message may be initiated after the communications session, from captions or transcripts that are accessible from the saved meeting data. For example, information for a past meeting may continue to be available to meeting participants or other authorized persons, who may access or generate meeting captions or transcripts for the past meeting. Additionally, some functions such as chat messages may continue to be utilized for on-going discussions by meeting participants after the live session has ended. The present disclosure provides a way to efficiently reply to/quote directly from captions or transcripts when continuing such on-going chat sessions. The described techniques allow for the efficient and direct composition of chat messages that include the context of an audio or video conversation in a way that text comments clearly relate to the relevant discussion in the meeting.

The present disclose also describes the underlying architecture, systems, and data objects that support the described messaging functionality. In some embodiments, such a data object can be a multi-dimensional data structure that tracks on a per-chat or per-message basis. The data structure may include a dimension where each individual message is associated with users and respective transcripts or captions for the users, thereby providing granular control of users, data, and permissions on a per-message basis.

While many of the examples described herein are illustrated around initiating chat messages from selected portions of a transcript or caption, other changes in modalities may be implemented, such as inputting a portion of an image, video, or any other object that is shareable.

In some embodiments, various entry points from a user perspective may be used to reply to/quote an online meeting audio/video conversation with a chat message. In one embodiment, a message may be generated from a transcription panel. In some embodiments, the open transcription panel may provide a transcription of a meeting conversation when activated. From the transcription panel, a user may use a user interface mechanism such as a rendered button to quote and refer to a selected portion of a conversation. In one embodiment, the active part of the UI may switch to the chat panel with the selected portion of a conversation being provided as the input. In another embodiment, the user may be provided a UI element for replying directly inside the transcription panel and then exposing the selected input in the chat panel.

In one embodiment, a message may be generated from a captions panel. In some embodiments, the open captions panel may provide a caption of a meeting conversation when activated. From the captions panel, a user may use a user interface mechanism to quote and refer to a selected portion of a captioned conversation. For example, the user may hover over a live caption message and use the hovered message as an entry point to reply to an audio comment using chat. In one embodiment, the active part of the UI may switch to the chat panel with the selected portion of a conversation being provided as the input. In another embodiment, the user may be provided a UI element for replying directly inside the captioning panel and then exposing the selected input in the chat panel. This feature may be useful for scenarios where users require the use of captions to efficiently participate in a conversation via the chat function.

In an embodiment, the reference(s) to the transcript or captioned conversation may be implemented as part of the compose experience during composition of the chat message.

After sending the composed message in the chat function, the message may be rendered with a reference to the selected transcript/caption. In this way, other participants can:

A. Understand what the composer is referring to with reference to time (with some delay for the composing and sending of the message).

B. Understand what the comment was referring at a later time once the meeting has ended.

C. Jump back to the quote to obtain more context of the source dialogue.

Technical problems encountered when attempting to switch modalities from a transcript or caption to chat sessions include a lack of efficient methods for linking the source conversation to the chat composition panel, which can result in multiple user actions and delays in responding to an on-going conversation. Lack of a consistent and automated methodology for switching modalities may result in users having to repeatedly interrupt processes in order to switch modalities, thereby consuming additional computing, storage, and network resources.

The disclosed embodiments enable the seamless integration of a meeting chat with audio/video conversations, thus addressing common communications session problems such as hanging chat messages that make following up on a meeting difficult if not impossible.

While many of the described examples are provided in the context of certain chat functions, the disclosed embodiments may be applied any type of interactive messaging application.

FIG. 1 illustrates a system 100 for enabling a user to quote, initiate, and reply using a chat messaging function based on a transcription or caption provided in a communications session. The figure illustrates transcription, captioning, and chat sessions in the context of applications 141. In this example, a user can interact with an individual application 141 to launch and participate in applications such as a communications session and send and receive messages. The applications 141 may each be configured to display a collaboration pane 191 and, in one example, a message pane 192. Various content pertaining to a collaboration session may be displayed in the collaboration pane 191. In the illustrated example, a user may receive questions, comments, and other data for the communication session. Other communicative features for functionality may be invoked in other examples. The message pane 192 of each application 141 may be synchronized to enable a user to receive data for application 141.

The use of a message pane 192 is one example implementation, and other types of communications interfaces may be enabled and provided on computing devices 106. The applications 141 may receive and send code/data 151. In some configurations, the code/data 151 can be in the form of text, images, media or any other form of data. The messaging service 120 may maintain messaging information for systems and devices via applications 141 and can send, for example, a message to a computing device 106A. The messaging service 120 may also monitor video, audio, and other data being communicated during a communications session and identify triggers that can cause a prompt to be sent to a moderator, or for security settings to be automatically invoked. The computing device 106A may receive moderator inputs for adding participants and send the settings to the messaging service 120. In response to a request to add a user to a messaging session, the collaboration service 170 may apply the security settings in configuring and rendering content to the computing device 106. The caption/transcription service 180 may generate captions or transcriptions for systems and devices via applications 141 and can send, for example, a caption or transcription to a computing device 106A. The caption/transcription service 180 may also monitor video, audio, and other data being communicated during a communications session and user voice recognition and other technologies to generate the captions or transcripts. The computing device 106A may receive the captions or transcripts for presentation on UI 190A-190N.

The code/data 151 can include data that is stored within storage service 110 including a data store 136 and managed by management service 120 comprising a management module 138. The code/data 151 can be communicated to any number of computing devices 106, referred to herein as computing devices 106B-106N, from a first computing device 106A or the service 110 via a network 108. Each computing device 106B-106N associated with a recipient can display the code/data 151 on a user interface 195 (195A-195N) by the use of a viewing application 142. The viewing application 142 can be any suitable application such as a presentation program, a web browser, a media player, etc. The viewing application 142 may also be a web-based application. In one embodiment, the viewing application 142 may be a virtual assistant that uses voice instead of a visual representation to convey data content, e.g., facilitating text-to-speech (TTS). In some embodiments, the viewing application 142 may be an augmented reality, mixed reality, or virtual reality device and the code/data 151 can be rendered within a virtual reality display.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable a user with certain impairments to view and interact with data in a wide range of communications and collaborative scenarios while operating a computing device. In addition, improved human interaction improves other computing resources such as processor and network resources, e.g., users can work from a reduced number of applications and reduce a user's computer interaction, reduce the chances of an inadvertent input, reduce network traffic, and reduce computational cycles. The techniques disclosed herein reduce the need to pause applications, reconfigure settings, incorporate updates for, and toggle between, a number of applications, including a specialized presentation program. Other technical effects other than those mentioned herein can also be realized from implementations of the technologies disclosed herein.

Figure 2A:
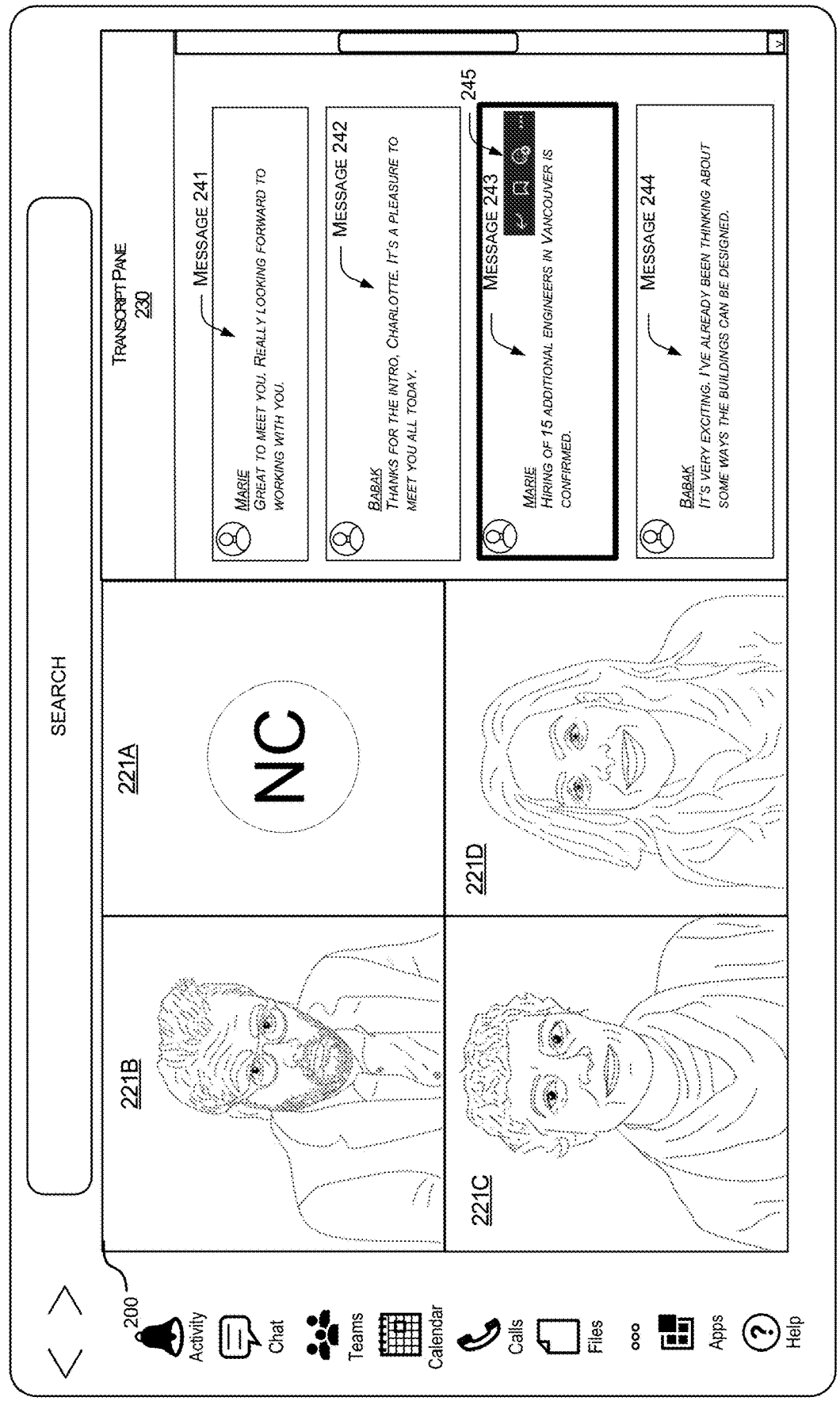
FIG. 2A illustrates an example user interface in accordance with an embodiment.

Turning to FIG. 2A, illustrated is an example user interface 200 showing a collaborative session including four participants 221A, 221B, 221C, and 221D. Meeting participants may be engaged in conversation and collaboration, and the transcription of the meeting may be displayed in the transcription pane 230, showing messages 241, 242, 243, and 244.

While viewing the meeting, a user may determine that a chat message would be helpful with the meeting participants, with reference to message 243. Rather than copying or typing the transcript contents and opening a chat pane, the user may hover over message 243. When hovering over message 243, a function pane 245 may be rendered with selectable options. The user may click the reply icon (arrow).

Figure 2B:
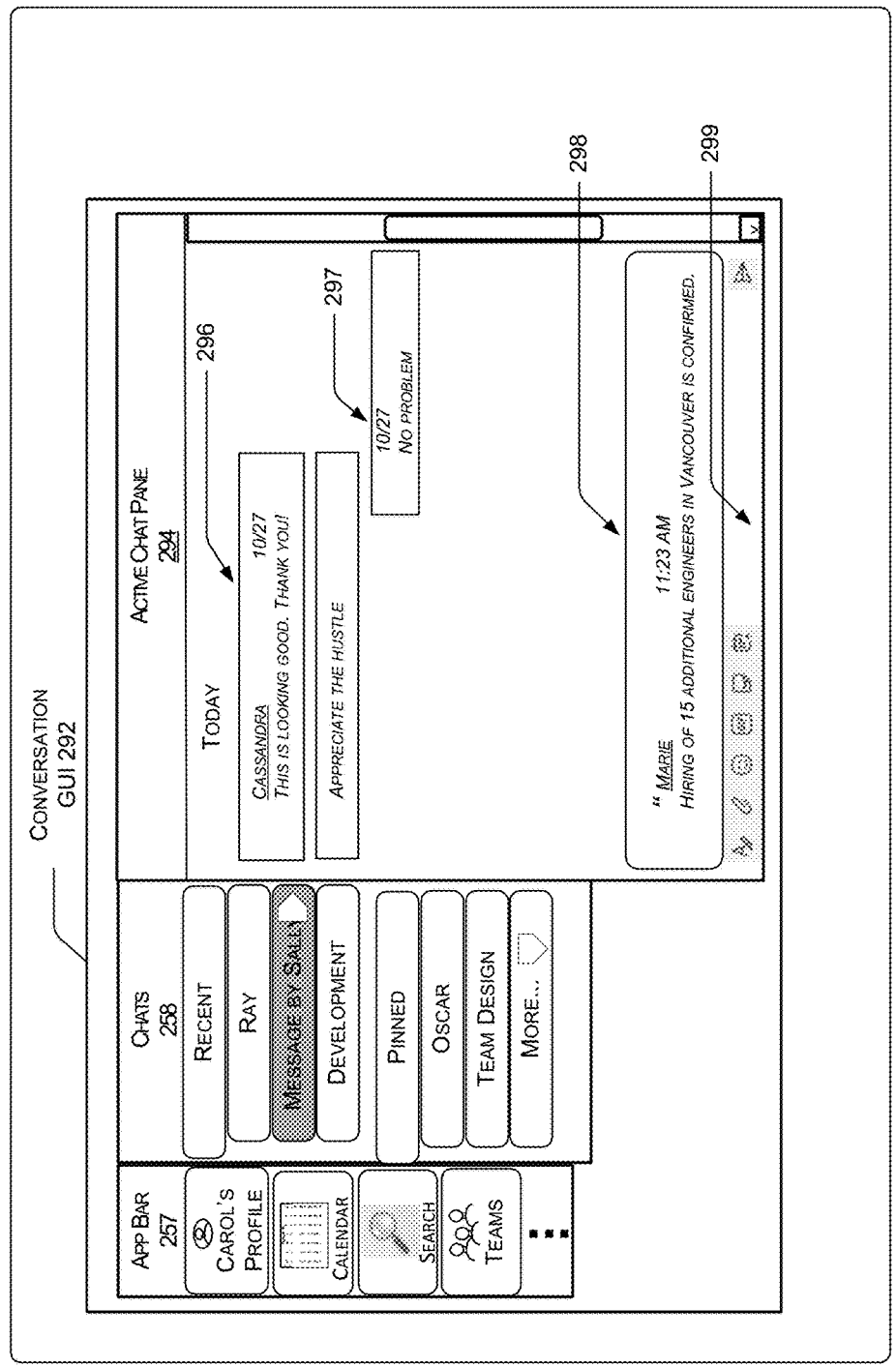
FIG. 2B illustrates an example user interface in accordance with an embodiment.

As shown in FIG. 2B the user may be presented with an example of a display screen 290 presenting a graphical user interface (GUI) 292 that illustrates a visual notification indicating shared messages. As illustrated, the graphical user interface 292 may be associated with a messaging application such that it contains conversations, and therefore, may be referred to herein as a conversation GUI 292. In the example of FIG. 2B, the conversation GUI 292 includes an app bar 257, a list of conversations/channels 258, and an active conversation pane 294.

The conversations/channels 258 includes a list of conversations that a user is participating in. As illustrated and by example only, the list of conversations/channels 258 may include a "message by Sally" indication. The user may receive other notifications in her chat window that a message from Sally is available. The active pane 294 may indicate message in the on-going chat session for participants in the collaboration session, including messages 296 and 297. The active pane 294 may include message 298 which is the message that was hovered by the user in FIG. 2A. The message 298 may further include an indication that the message includes a quoted message. For example, FIG. 2B shows that the message includes a double quotation mark for this indication. Other ways of treating the quoted message may be implemented. Additionally, message 298 includes a time and/or date stamp to indicate the time/date of the original quote. The user may enter responses in the entry pane 299. In some embodiments, the user may view the message(s) and will be able to reply to via a text message /image/files/ any other object that is supported by the messaging application.

Figure 2C:
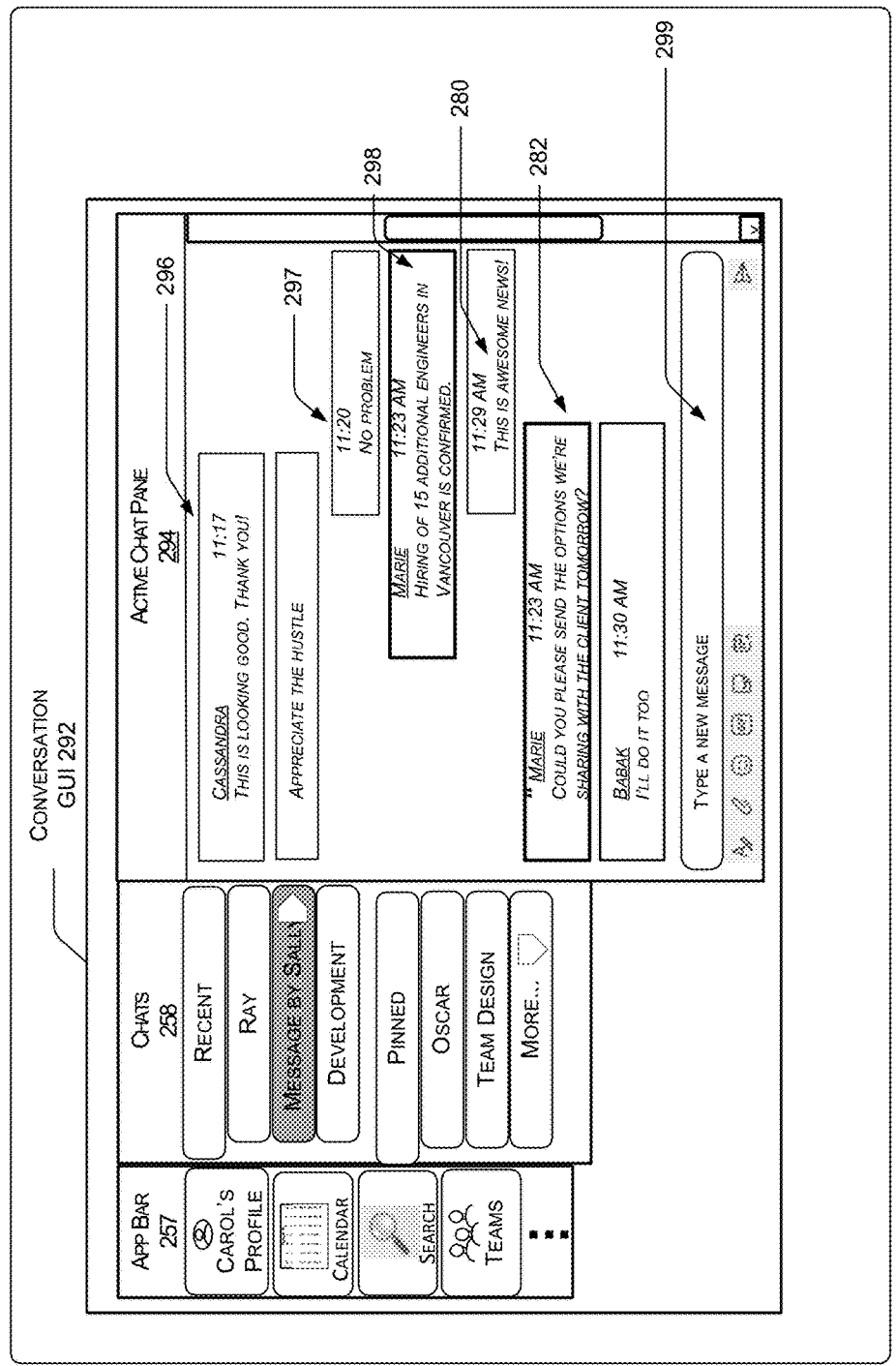
FIG. 2C illustrates an example user interface in accordance with an embodiment.

FIG. 2C illustrates that in response to entering a message in entry pane 299, the typed message 280 may be rendered. Subsequent messages 282 may be rendered.

Figure 2D:
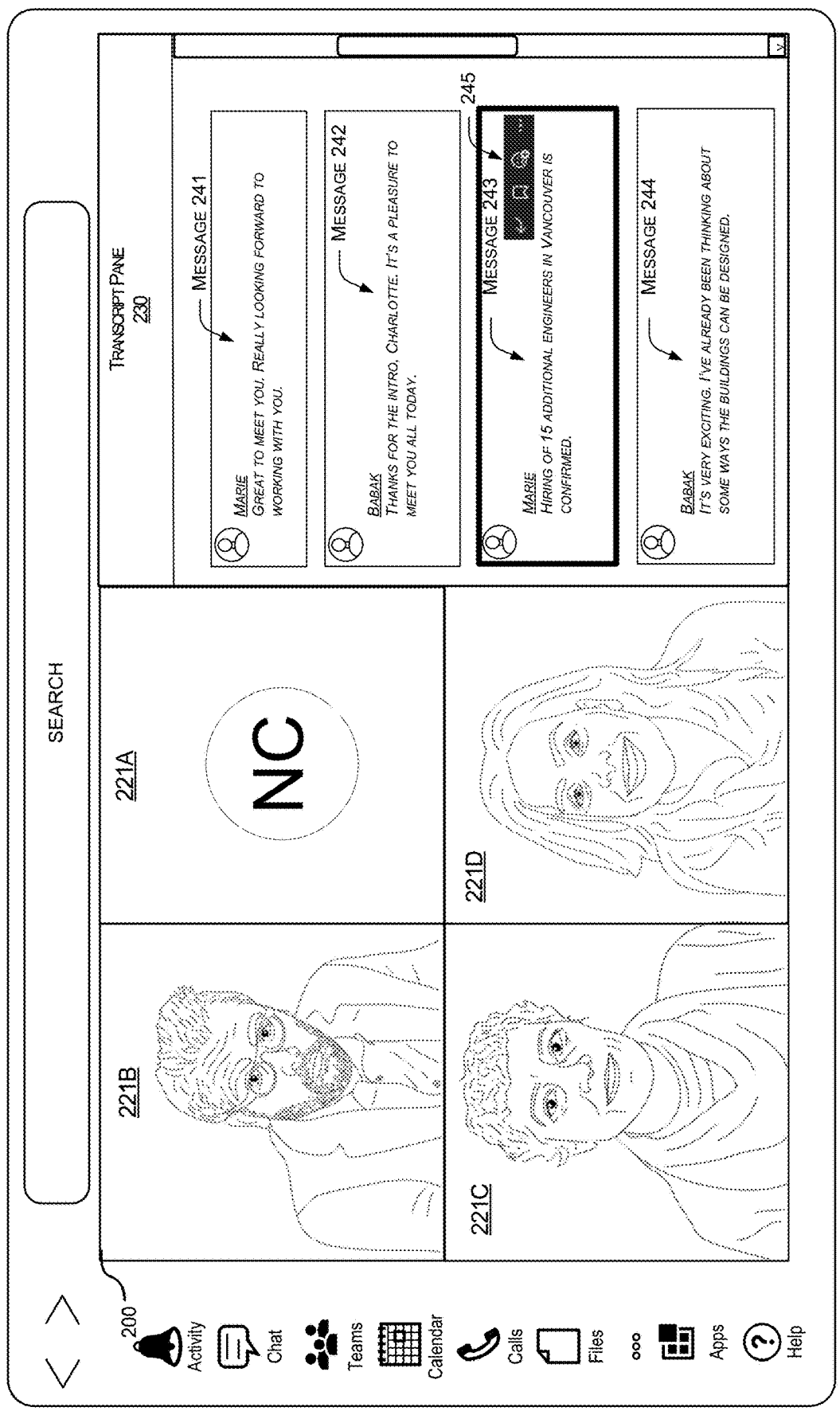
FIG. 2D illustrates an example user interface in accordance with an embodiment.

Referring to FIG. 2D, illustrated is an example where the user reply for the selected/hovered message is enabled within the transcript view. Illustrated is the user interface 200 showing the collaborative session including four participants 221A, 221B, 221C, and 221D, and the transcription of the meeting displayed in the transcription pane 230, showing messages 241, 242, 243, and 244.

While viewing the meeting, the user may determine that a chat message would be helpful with the meeting participants, with reference to message 243. The user may hover over message 243. When hovering over message 243, the function pane 245 may be rendered with selectable options. The user may click the reply icon (arrow).

Figure 2E:
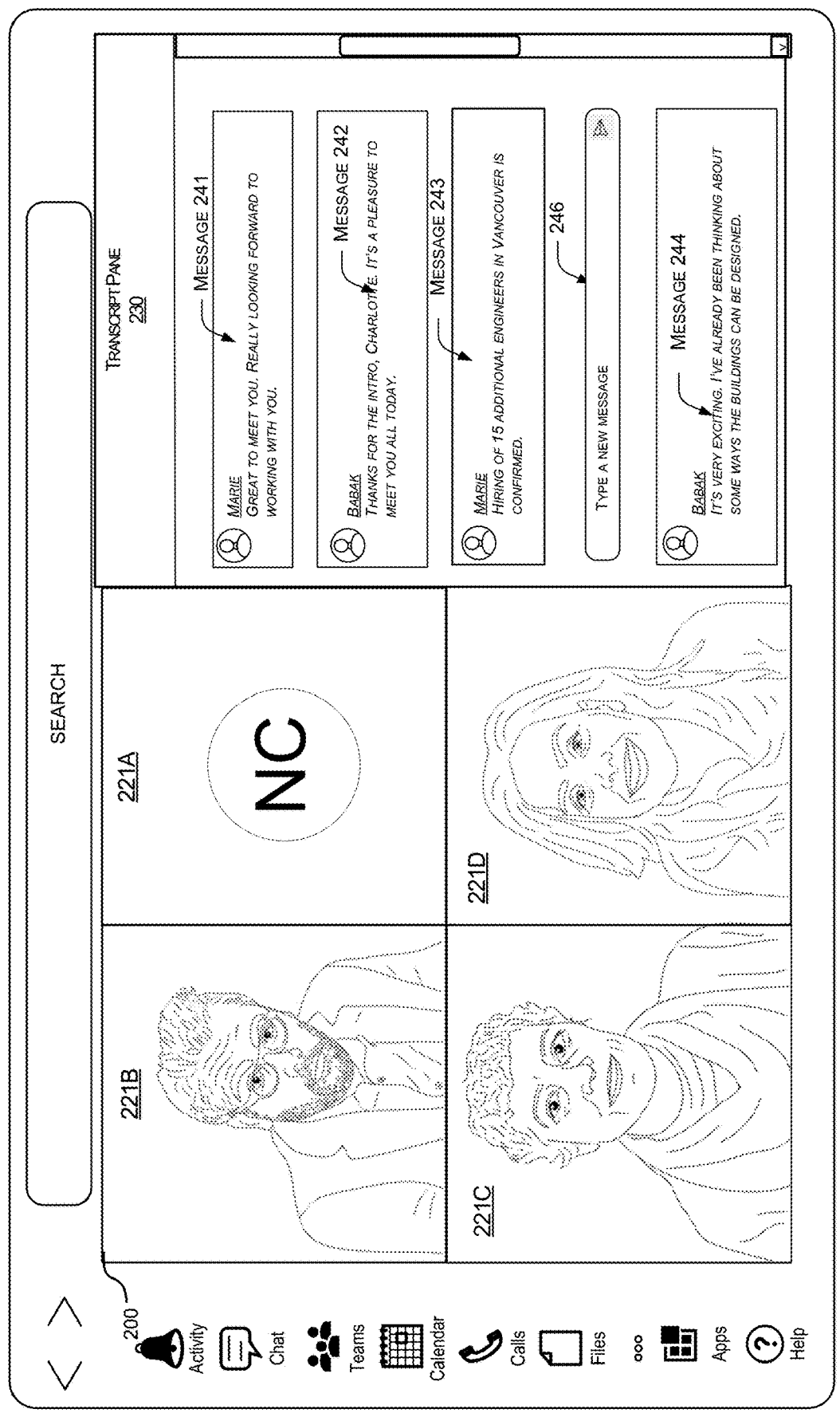
FIG. 2E illustrates an example user interface in accordance with an embodiment.

As shown in FIG. 2E, the user may be presented with a reply pane 246 that is rendered within the transcript pane 230. The user may enter an input to the chat pane directed in the reply pane 246.

Figure 2F:
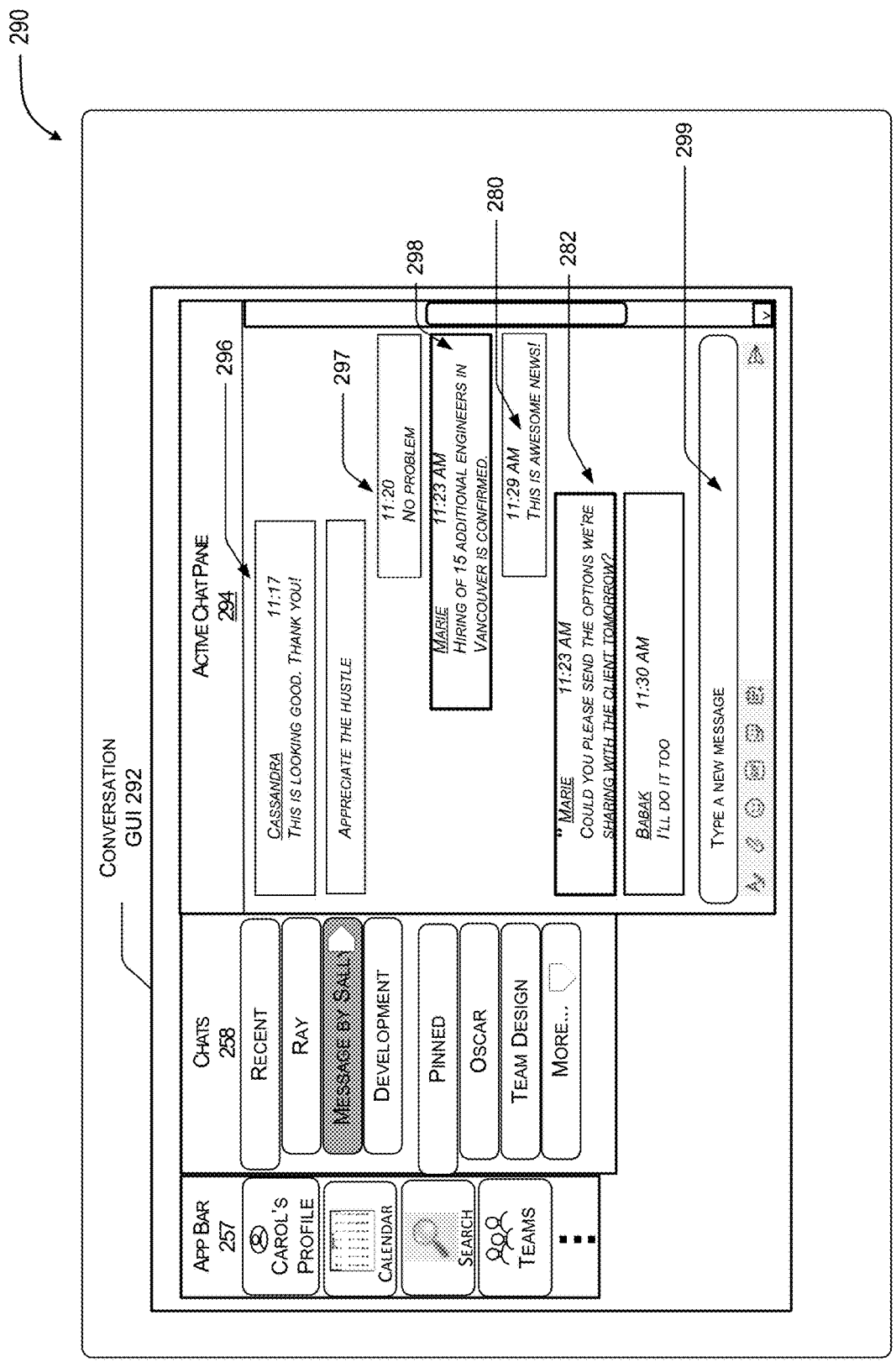
FIG. 2F illustrates an example user interface in accordance with an embodiment.

FIG. 2F illustrates that in response to entering a message in reply pane 246, the typed message 280 may be rendered. Subsequent messages 282 may be rendered.

Figure 2G:
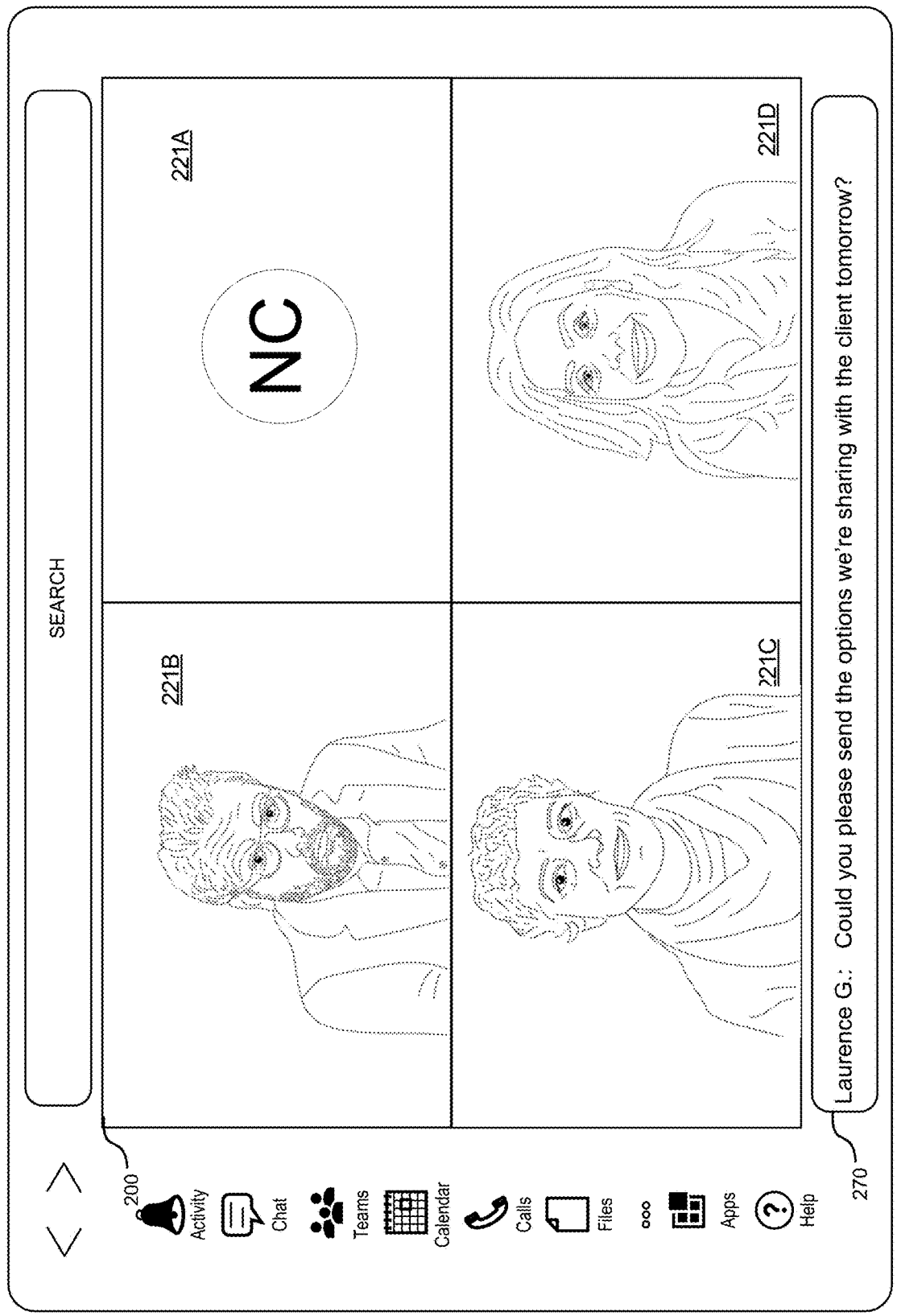
FIG. 2G illustrates an example user interface in accordance with an embodiment.

Turning to FIG. 2G, illustrated is an example user interface 200 showing a collaborative session including four participants 221A, 221B, 221C, and 221D. Meeting participants may be engaged in conversation and collaboration, and a live caption of the meeting discussion may be displayed in the caption pane 270.

While viewing the meeting, a user may determine that a chat message would be helpful with the meeting participants, with reference to caption 270. Rather than copying or typing the caption contents and opening a chat pane, the user may hover over caption 270. When hovering over caption 270, a function pane 222 may be rendered with selectable options. The user may click the reply icon (arrow).

Figure 2H:
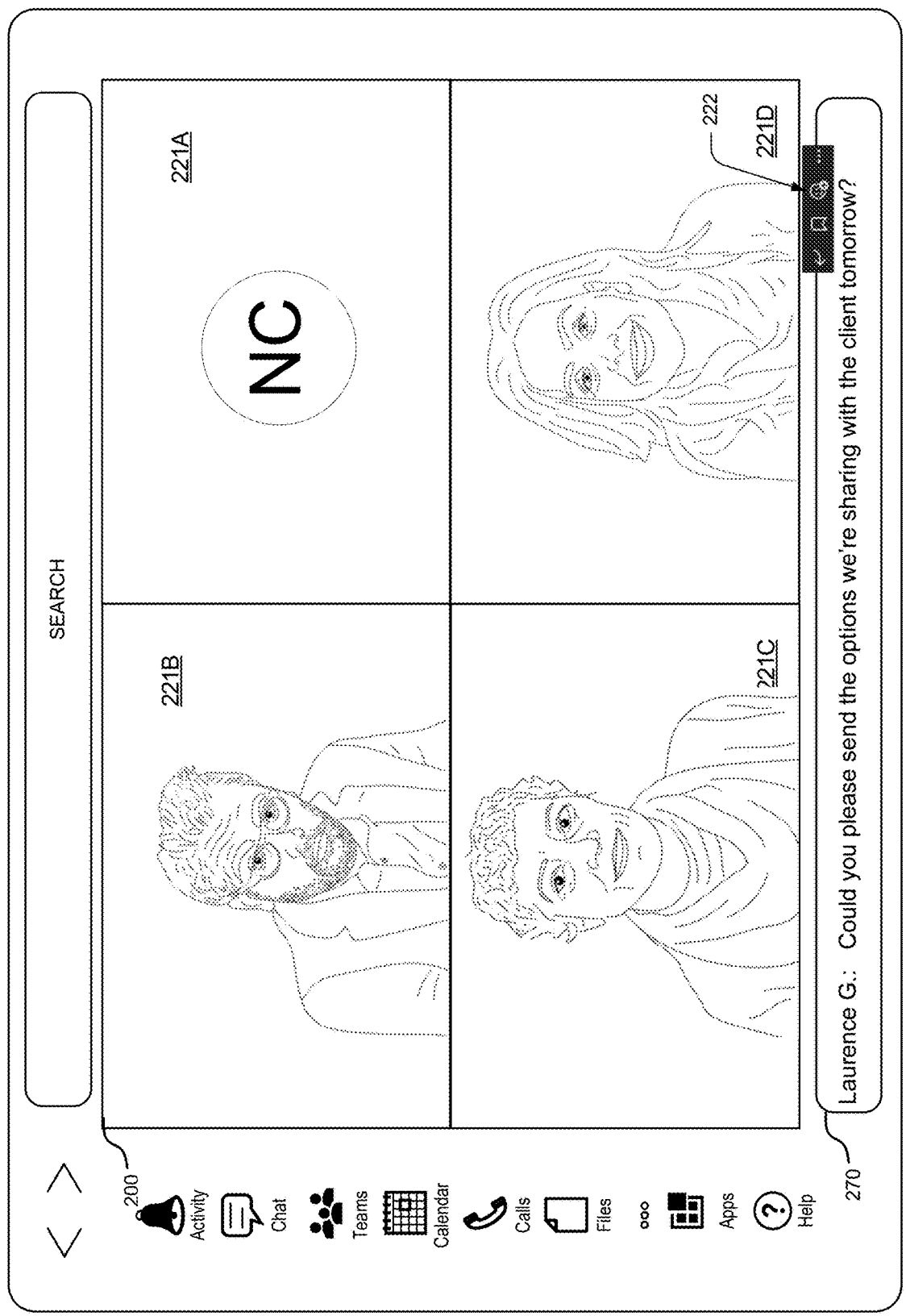
FIG. 2H illustrates an example user interface in accordance with an embodiment.
Figure 2J:
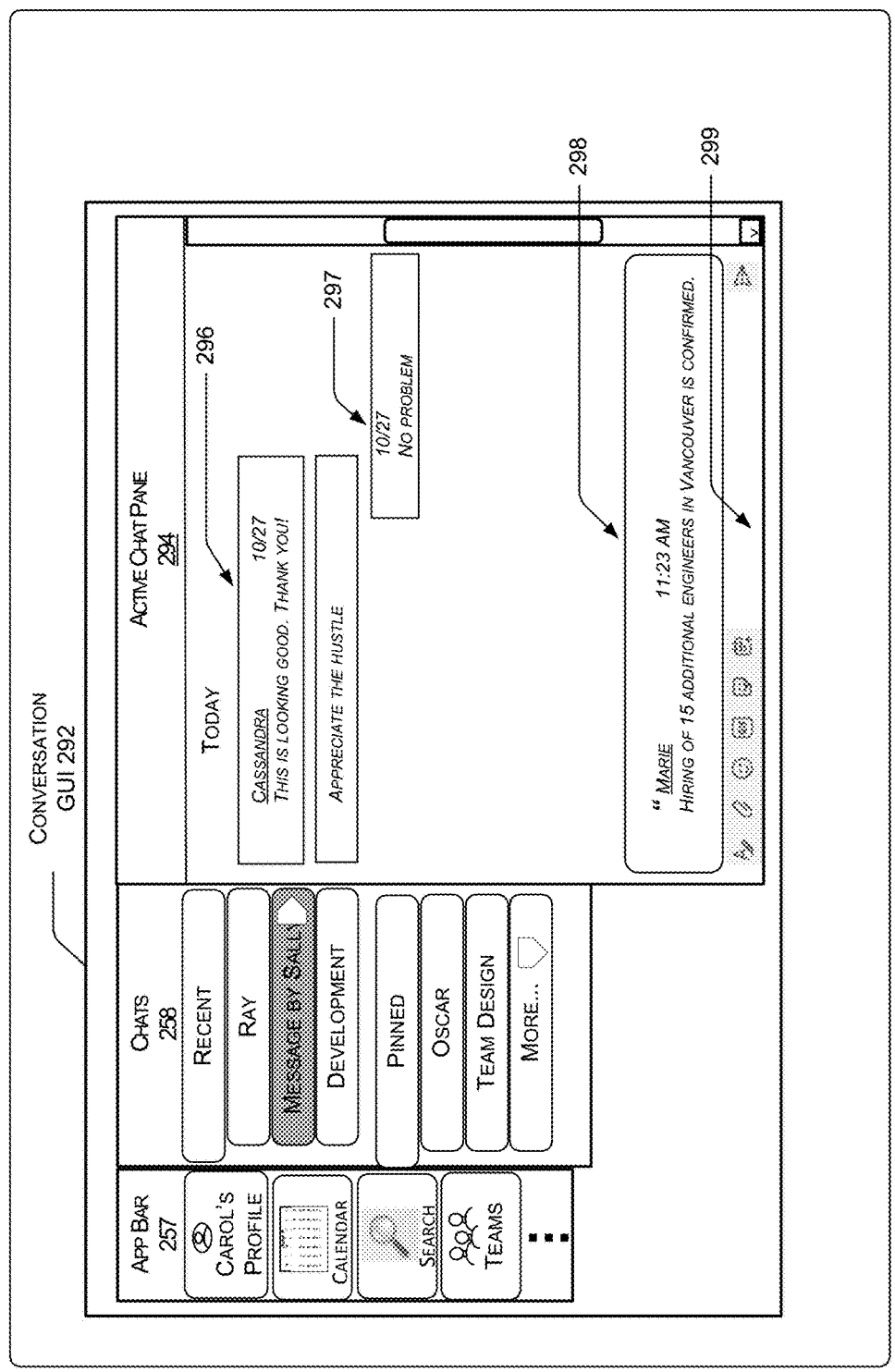
FIG. 2J illustrates an example user interface in accordance with an embodiment.

As shown in FIG. 2J the user may be presented with an example of display screen 290 presenting graphical user interface (GUI) 292 that illustrates a visual notification indicating shared messages. The active pane 294 may indicate messages in the on-going chat session for participants in the collaboration session, including messages 296 and 297. The active pane 294 may include message 298 which is the message that was hovered by the user in FIG. 2H. The user may enter responses in the entry pane 299. In some embodiments, the user may view the message(s) and will be able to reply to via a text message/image/files/any other object that is supported by the messaging application.

Figure 2K:
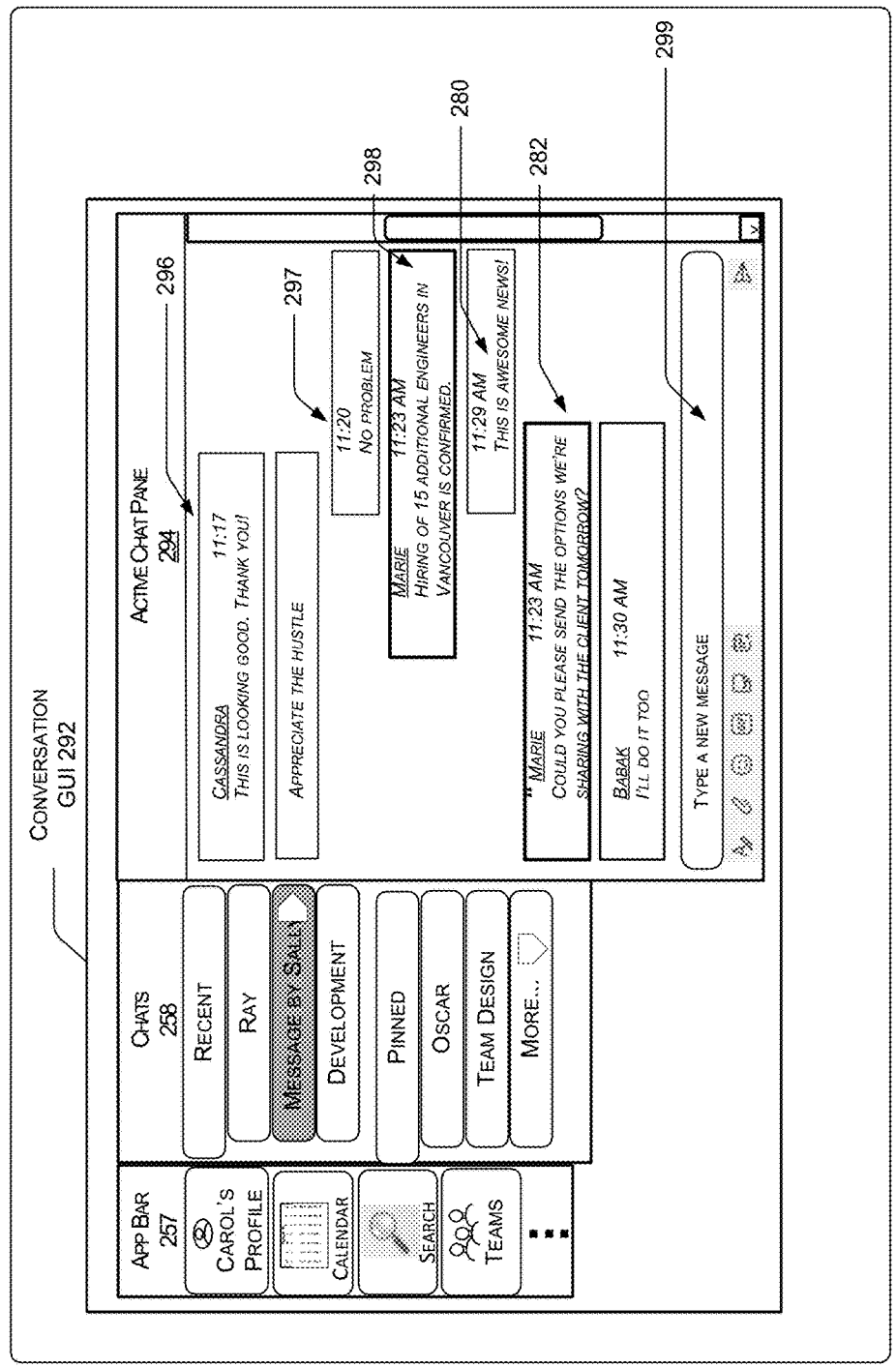
FIG. 2K illustrates an example user interface in accordance with an embodiment.

FIG. 2K illustrates that in response to entering a message in entry pane 299, the typed message 280 may be rendered. Subsequent messages 282 may be rendered.

Figure 3A:
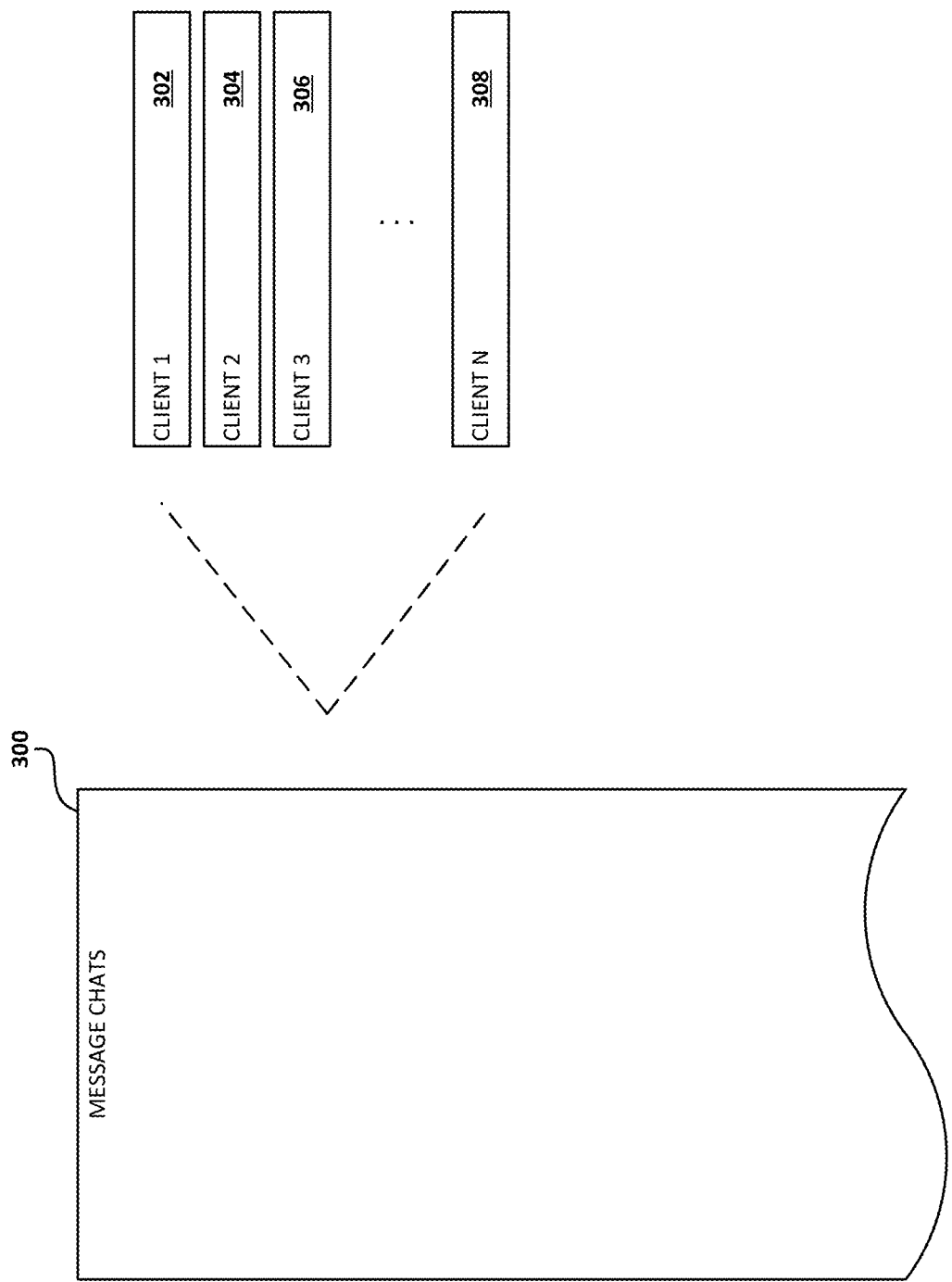
FIG. 3A illustrates an example system diagram in accordance with an embodiment.

FIGS. 3A to FIG. 3H illustrate various embodiments for implementing the techniques described herein. Turning to FIG. 3A, illustrated is an example application 300 rendering or otherwise processing messaging sessions for a number of clients 302, 304, 306, and 308, which in various scenarios can be users or participants in a communications session.

Figure 3B:
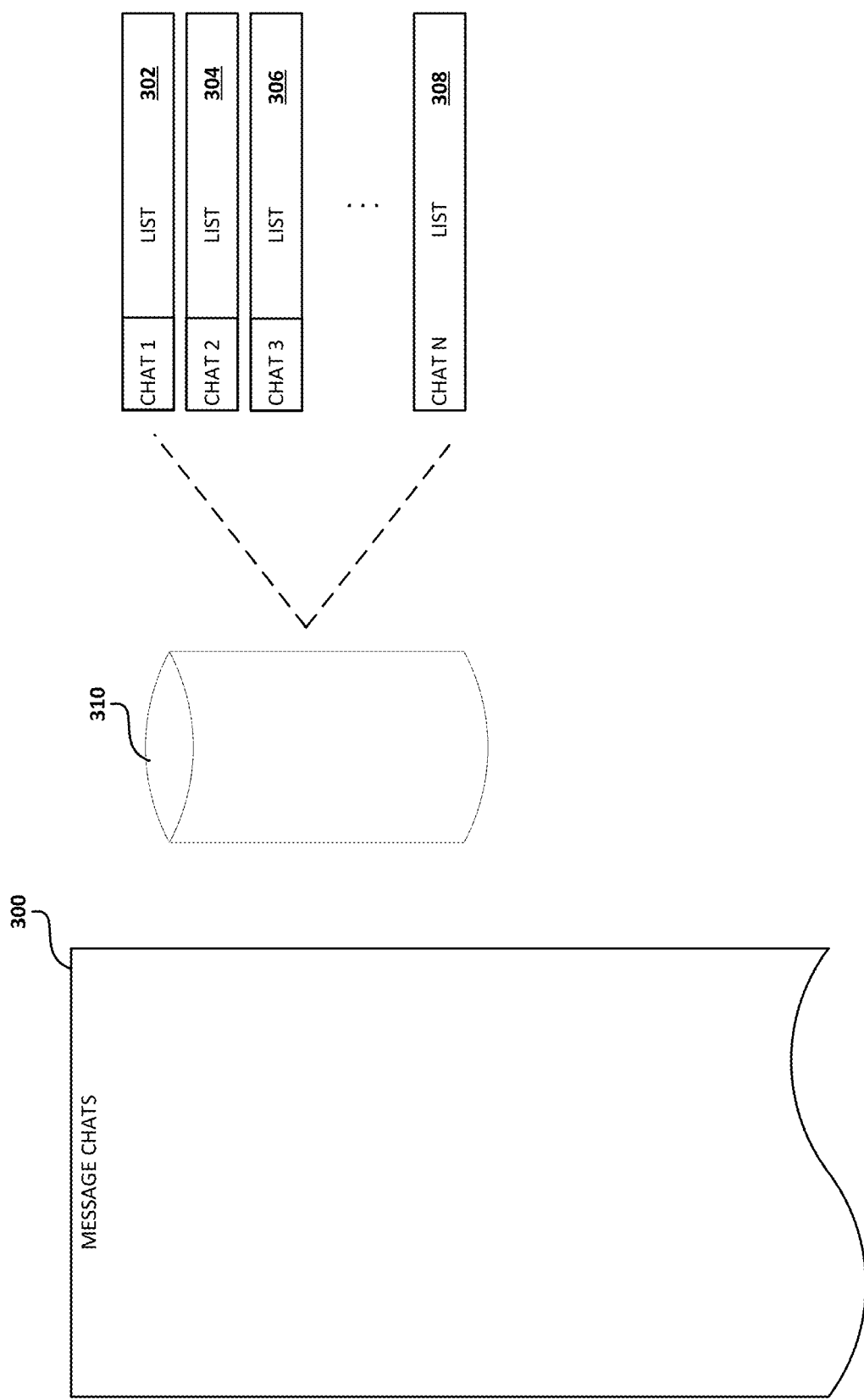
FIG. 3B illustrates an example system diagram in accordance with an embodiment.

Turning to FIG. 3B, illustrated is an example data storage 310 which may store thereon a database storing chat threads for the clients 302, 304, 306, and 308. For each chat thread, the record for each thread may include a list of users participating in each thread. As used herein, the record for each thread as well as other records described herein may be implemented as a data structure. It will be appreciated by one skilled in the art that the data structure shown in the figure may represent a data file, a database table, an object stored in a computer storage, a programmatic structure or any other data container commonly known in the art. Each data element included in the data structure may represent one or more fields in a data file, one or more columns of a database table, one or more attributes of an object, one or more variables of a programmatic structure or any other unit of data of a data structure commonly known in the art.

Figure 3C:
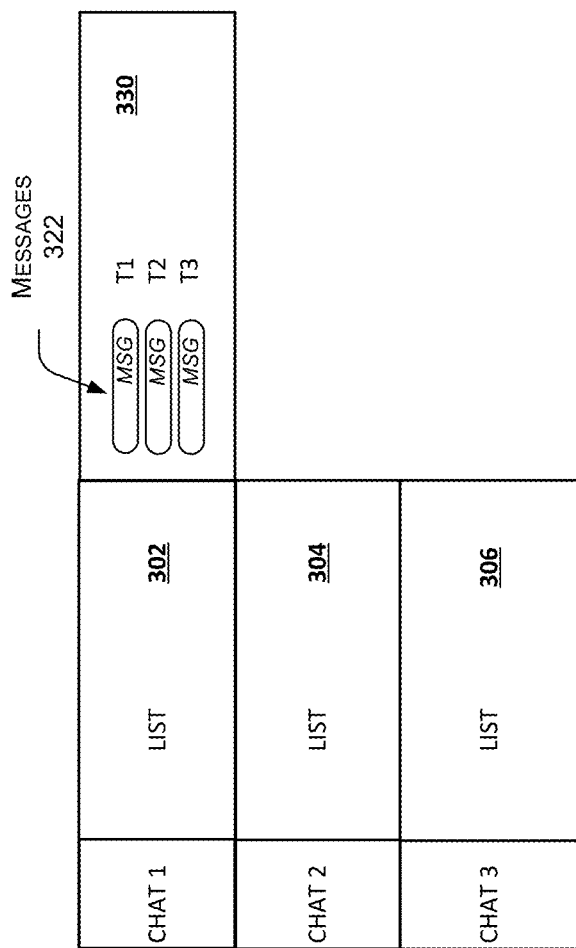
FIG. 3C illustrates an example system diagram in accordance with an embodiment.

Turning to FIG. 3C, illustrated is data structure 330 which may store thereon a record of messages 322 for each chat thread and associated times for the messages. In some embodiments, metadata can be included for each chat thread or message.

Figure 3D:
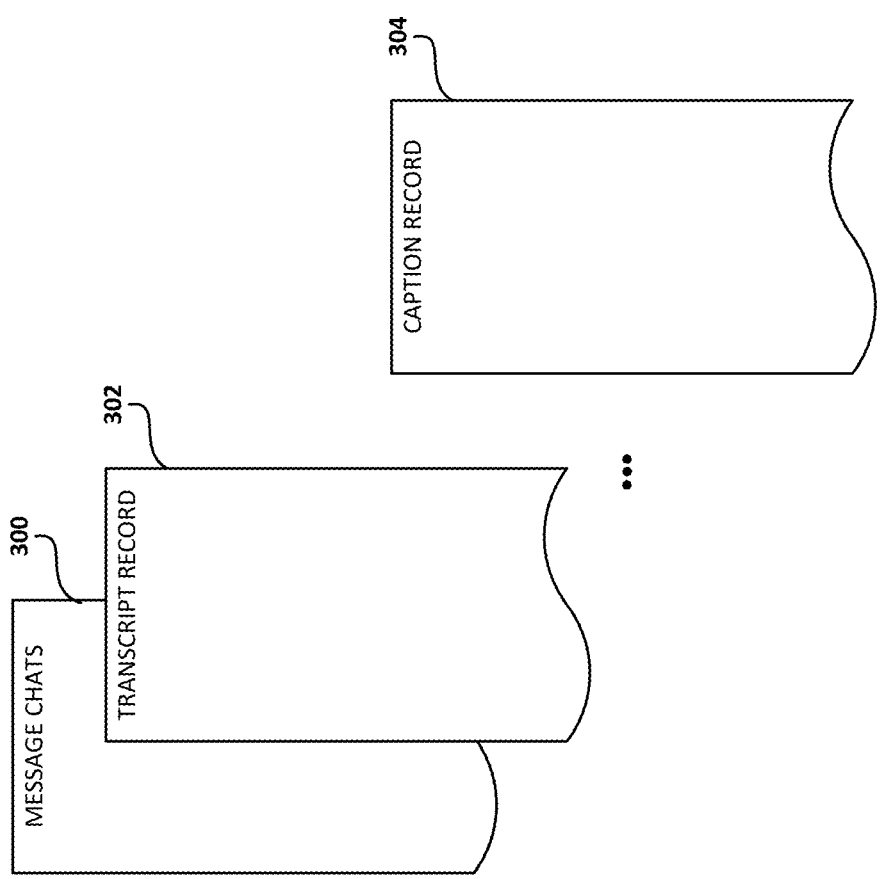
FIG. 3D illustrates an example system diagram in accordance with an embodiment.

Turning to FIG. 3D, illustrated is an example showing data structures for communications sessions include message chat thread data 300, transcript record 302, and caption record 304 that may be generated, for instance when a communications session is initiated.

Figure 3E:
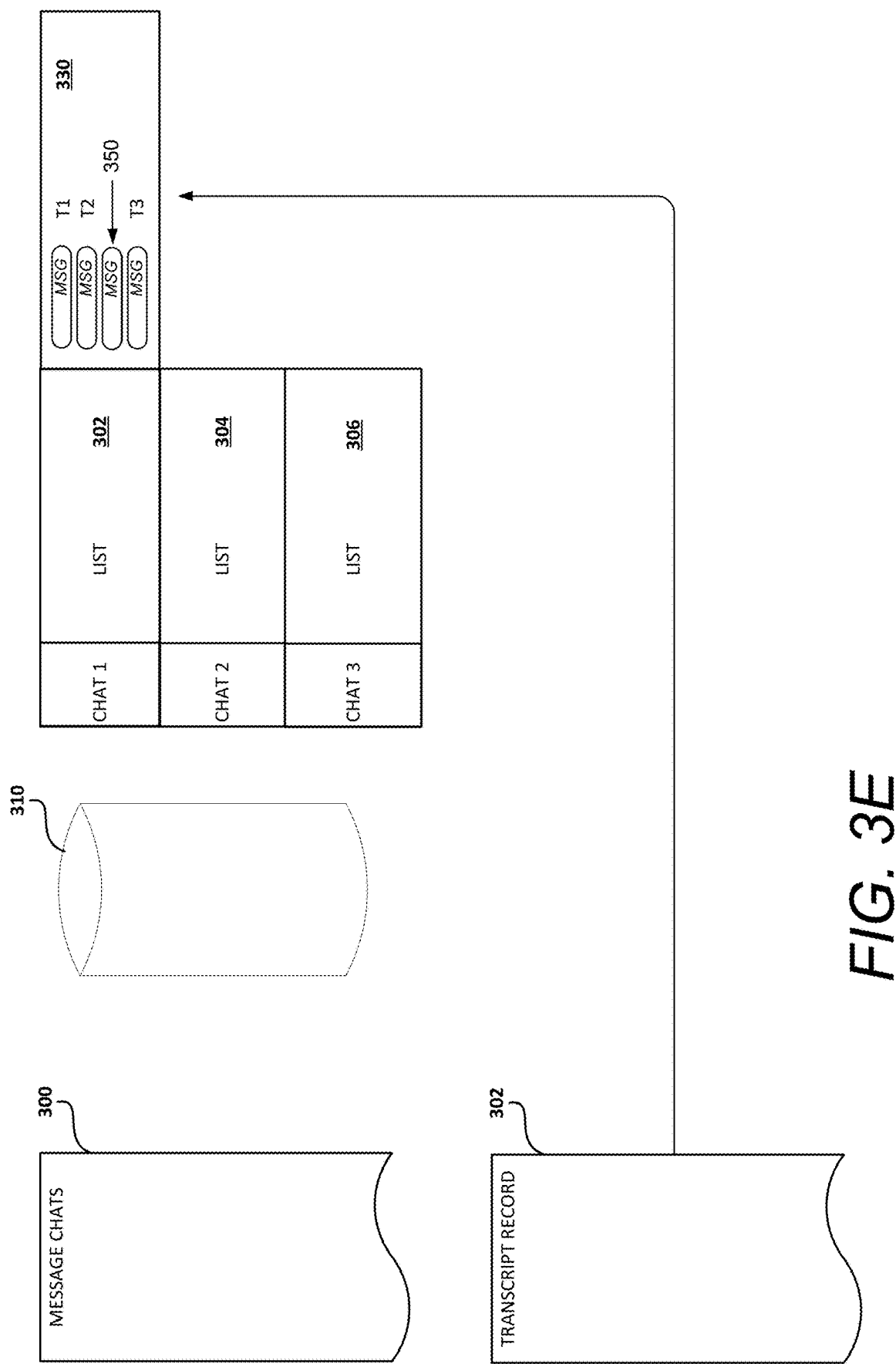
FIG. 3E illustrates an example system diagram in accordance with an embodiment.

Turning to FIG. 3E, illustrated is an example where data structure 330 is updated to include a new chat message 350 which was generated from transcript record 302. The updated data structure 330 will now store a record of messages for the chat thread which includes chat message 350 and may be further updated with additional messages as users reply to the new chat message 350. Applicable metadata may be stored for each of the messages associated with the record of messages.

In some embodiments, the quoted message (e.g., message 298 above) may include indications, such as the quotation mark in the above examples, to indicate that the message is a quotation from a participant. In one embodiment, the quoted message may provide a link to the original context of the quote. For example, the user may be able to click on the quoted message, and the user may be provided with the original transcript at the time of the quoted message.

In some embodiments, the original source of the quoted message may include an indication that a chat message has been generated for the quoted message. For example, the transcript of the meeting may highlight or otherwise include a visual indication to indicate that that the quoted portion of the transcript a chat message pertains to an associated chat message. In some embodiments, a link may be included so that a user can click on the quoted portion and be taken to the relevant chat session or message.

In some embodiments, the collaboration system may perform analysis of a selected quote to provide pre-populated or suggested responses when opening the chat message pane. The collaboration system may use machine learning or other techniques to analyze the content of the selected quote. For example, if the selected quote pertains to a request for a meeting at a requested date and time, the collaboration system may obtain calendar information for the user who selected the quote, and pre-populate a chat message with text indicating that the user has a conflict at the requested date/time.

In some embodiments, the user may be provided the option of selecting a chat message recipient or group of recipients other than the participants of the current meeting. For example, the user may be able to select a quote and initiate a chat message to the current participant group, or initiate a side chat with another user or group of users. This may be subject to privacy and security permissions for the other users.

While many of the examples described herein are illustrated around initiating chat messages from selected portions of a transcript or caption, other sources may be used to generate a chat message. For example, in one embodiment, a user may initiate a chat message while viewing a recording of a communication session. If the user wishes to respond to a statement made by a participant, the user may pause the playback, and the user may be provided a chat window or pane to generate a chat message. A contextual quote may be generated based on the timestamp where the playback has been paused. The contextual quote may be generated based on an existing transcription of the communication session, or a transcription may be generated based on the time stamp and a voice-to-text conversion of the recorded content at the time where the playback has been paused. In one embodiment, an audio clip of the relevant portion of the meeting recording may be included with the chat response.

While many of the examples are illustrated using a single transcription quote or caption, the user may be provided a way to select a portion of a quote or multiple quotes. For example, a user may select a series of quotes from one or more speakers, and initiate a chat message based on the selected quotes. A user may right-click or use other input means to surface an option to initiate a chat message. As another example, the user may select a portion of a quote and initiate a chat message based on the selected portion.

While many of the examples are illustrated using a collaboration session and chat message as the modalities, the described techniques can be applied to other scenarios where a live or recorded event is being consumed, and a user wishes to generate a message. For example, a user may view a live event or recorded event, and provide an input indicating that the user wishes to enter a comment at a particular point in the event. The user may be taken to a chat, comment, or other input function to generate a message or comment. The message or comment may be associated with a time stamp of the particular point in the event. A captured portion of the event (audio clip, video clip, transcription of a portion of the event, or metadata that describe the particular point in the event) may be included in the message or comment.

Figure 4:
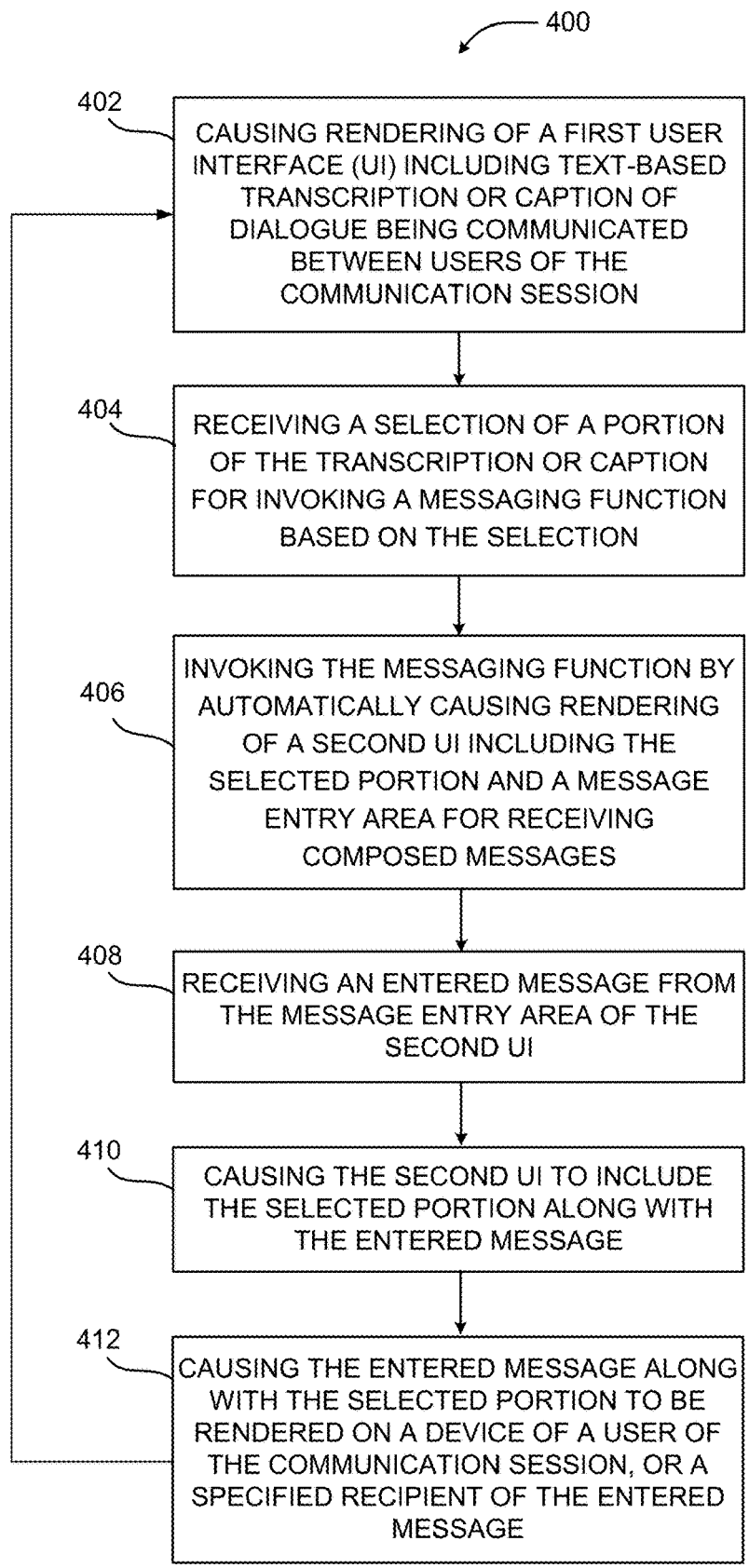
FIG. 4 illustrates a routine for reply to/quote directly from captions or transcripts according to one embodiment.

FIG. 4 is a flow diagram illustrating aspects of a routine 400 to be performed by a data processing system for generating messages associated with a communication session. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 400 is described as running on a system 40, it can be appreciated that the routine 400 and other operations described herein can be executed on an individual computing device, e.g., computing device 44, or several devices.

Additionally, the operations illustrated in FIG. 4 and the other figures can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 400 begins at operation 402, which illustrates causing rendering of a first user interface (UI) for the communication session on a user device. In an embodiment, the first UI includes a text-based transcription or caption of dialogue being communicated between users of the communication session.

Operation 404 illustrates receiving a selection of a portion of the transcription or caption for invoking a messaging function based on the selection.

Operation 406 illustrates in response to receiving the selection, invoking the messaging function by automatically causing rendering of, on the user device, a second UI including the selected portion and a message entry area for receiving composed messages. In an embodiment, the messaging function is separate from functionality providing the text-based transcription or caption. In an embodiment, messages generated by the messaging function are not part of the transcription or caption dialogue. In an embodiment, the second UI is separate from the first UI and rendered independently of the first UI. For example, the second UI may be rendered on a user display whether or not the first UI is rendered on the user display, and the first UI may be rendered on a user display whether or not the second UI is rendered on the user display.

In an embodiment, the second UI renders a session of the messaging function that is associated with the communication session and is operable during the communication session or after the communication session.

Operation 408 illustrates receiving an entered message from the message entry area of the second UI.

Operation 410 illustrates in response to receiving the entered message, causing the second UI to include the selected portion along with the entered message.

Operation 412 illustrates causing the entered message along with the selected portion to be rendered on a device of a user of the communication session, or a specified recipient of the entered message.

Figure 5:
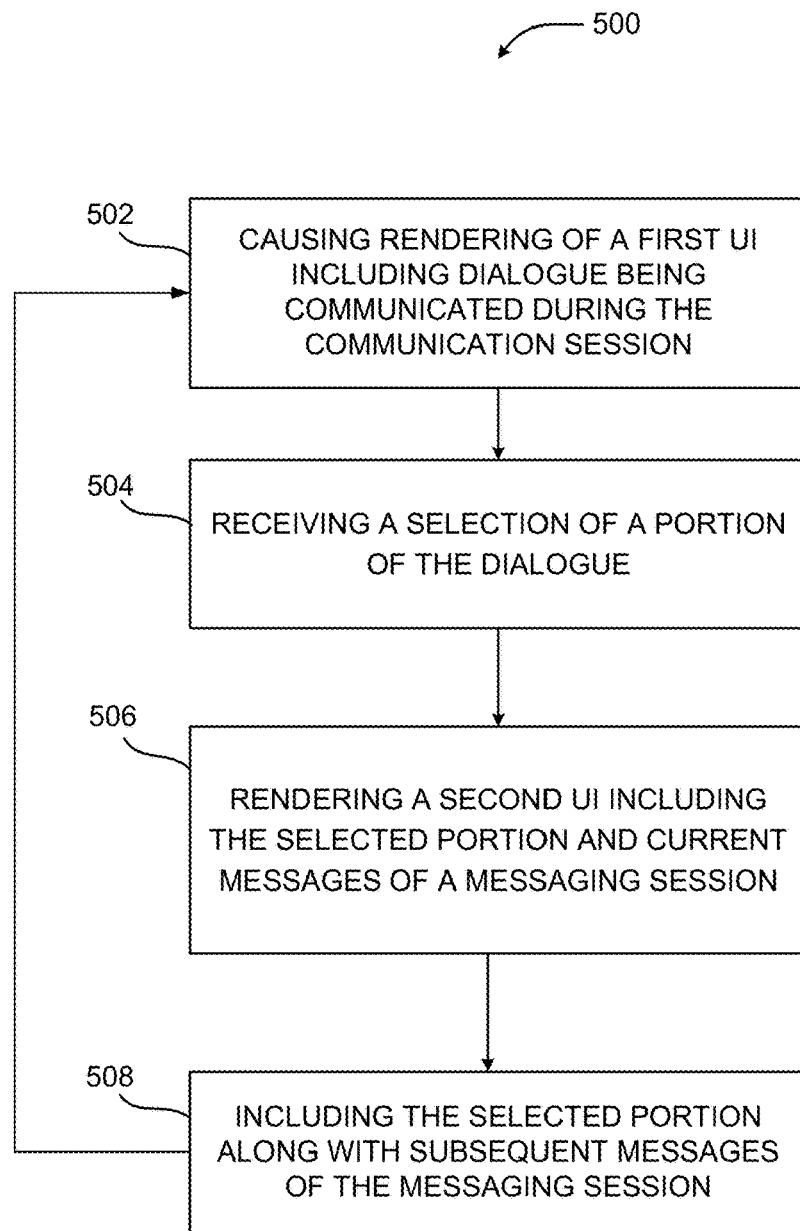
FIG. 5 illustrates a routine for reply to/quote directly from captions or transcripts according to one embodiment.

FIG. 5 is a flow diagram illustrating aspects of a routine 500 for generating messages associated with a communication session.

The routine 500 begins at operation 502, where the system can cause rendering of a first user interface (UI) on a user device, the first UI including dialogue being communicated during the communication session.

At operation 504, the system can receive a selection of a portion of the dialogue.

At operation 506, in response to receiving the selection, the system causes rendering of, on the user device, a second UI including the selected portion and current messages of a messaging session.

At operation 508, the system can include the selected portion, on the second UI, along with subsequent messages of the messaging session.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 6:
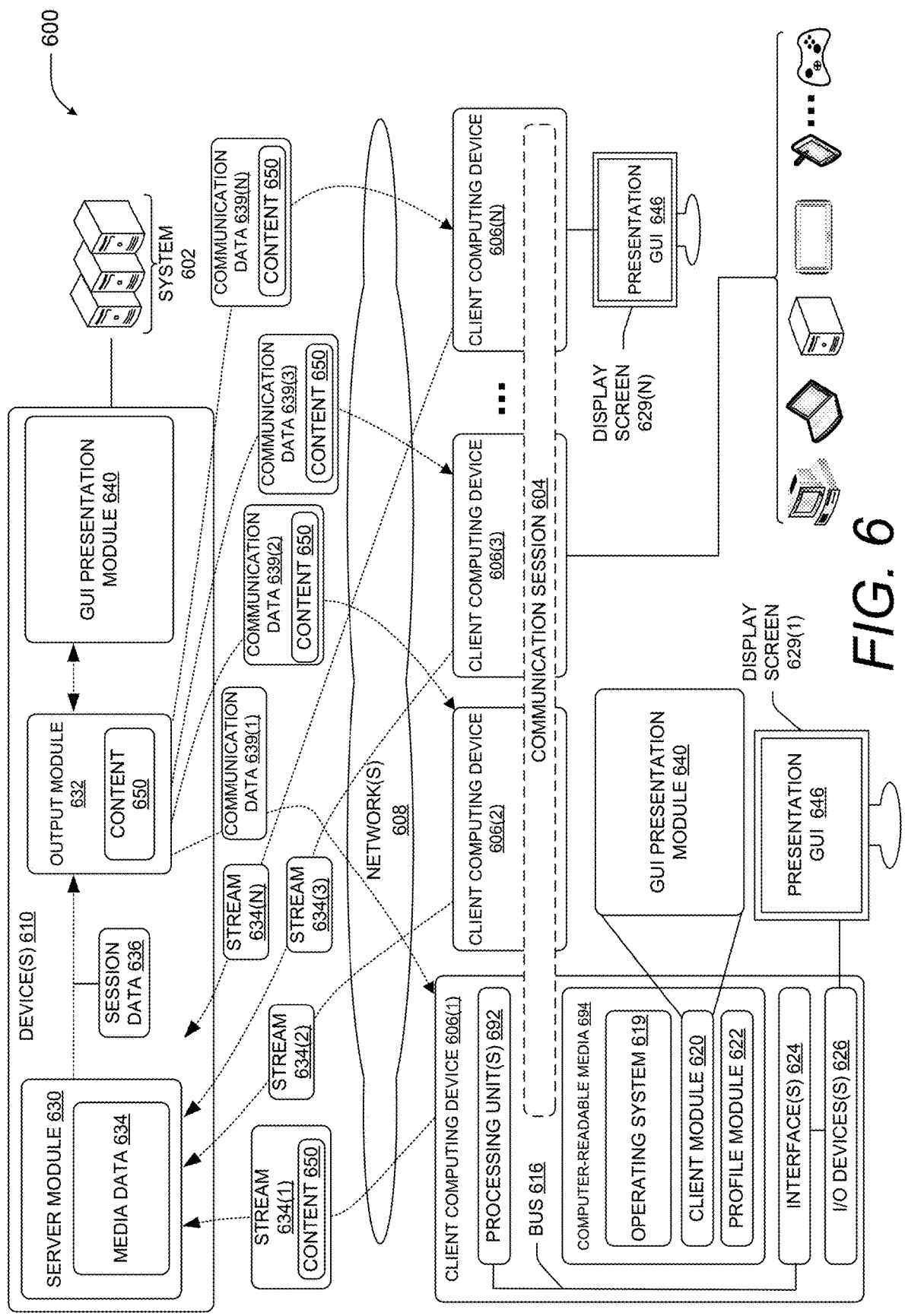
FIG. 6 is a computing system diagram showing aspects of an illustrative operating environment for the technologies disclosed herein.

FIG. 6 is a diagram illustrating an example environment 600 in which a system 602 can implement the techniques disclosed herein. In some implementations, a system 602 may function to collect, analyze, and share content that is displayed to users of a communication session 604. As illustrated, the communication session 604 may be implemented between a number of client computing devices 606(1) through 606(N) (where N is a number having a value of two or greater) that are associated with the system 602 or are part of the system 602. The client computing devices 606(1) through 606(N) enable users, also referred to as individuals, to participate in the communication session 604. The client computing devices 606 can correlate to the user computing devices 106 shown in FIG. 1. Although some examples show one of the computers 606 processing aspects of the present techniques, it can be appreciated that the techniques disclosed herein can be applied to other computing devices and are not to be construed as limiting.

In this example, the communication session 604 is hosted, over one or more network(s) 608, by the system 602. That is, the system 602 can provide a service that enables users of the client computing devices 606(1) through 606(N) to participate in the communication session 604 (e.g., via a live viewing and/or a recorded viewing). Consequently, a "participant" to the communication session 604 can comprise a user and/or a client computing device (e.g., multiple users may be in a room participating in a communication session via the use of a single client computing device), each of which can communicate with other participants. As an alternative, the communication session 604 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 604. A computerized agent to collect participant data in the communication session 604 may be able to link to such external communication sessions. Therefore, the computerized agent may receive information, such as date, time, session particulars, and the like, that enables connectivity to such external communication sessions. In one example, a chat conversation can be conducted in accordance with the communication session 604. Additionally, the system 602 may host the communication session 604, which includes at least a plurality of participants co-located at a meeting location, such as a meeting room or auditorium, or located in disparate locations.

In the examples described herein, client computing devices 606(1) through 606(N) participating in the communication session 604 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 604 live as activity occurs, or alternatively, via a recording at a later time after the activity occurs. In examples described herein, client computing devices 606(1) through 606(N) participating in the communication session 604 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations. Each stream can also include text, audio and video data, such as the data communicated within a channel, chat board, or a private messaging service.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 604. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.6 standards (e.g., 802.6g, 802.6n, 802.6ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) (which are also referred to herein as computing devices 104A-104N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices (not shown in FIG. 6) to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(1)), which can display a UI according to the techniques described herein.

In the example environment 600 of FIG. 6, client computing devices 606(1) through 606(N) may use their respective client modules 620 to connect with one another and/or other external device(s) in order to participate in the communication session 604, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) (each of which are also referred to herein as a "data processing system") may use their respective profile modules 622 to generate participant profiles (not shown in FIG. 6) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 6, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 604 (the collection being referred to herein as "media data 634"). In some scenarios, not all of the client computing devices that participate in the communication session 604 provide a media stream. For example, a client computing device may only be a consuming, or a "listening", device such that it only receives content associated with the communication session 604 but does not provide any content to the communication session 604.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the GUI presentation module 640, at the device(s) 610 and/or the client computing device 606, may analyze communication data 639 to determine an appropriate manner for displaying video, image, and/or content on the display screen 629(1) of an associated client computing device 606. In some implementations, the GUI presentation module 640 may provide video, image, and/or content to a presentation GUI 646 rendered on the display screen 629(1) of the associated client computing device 606. The presentation GUI 646 may be caused to be rendered on the display screen 629(1) by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, and a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had while viewing the presenter. In some implementations, the presentation GUI 646 may include a video feed of a plurality of participants associated with a meeting, such as a general communication session. In other implementations, the presentation GUI 646 may be associated with a channel, such as a chat channel, enterprise teams channel, or the like. Therefore, the presentation GUI 646 may be associated with an external communication session that is different than the general communication session.

Figure 7:
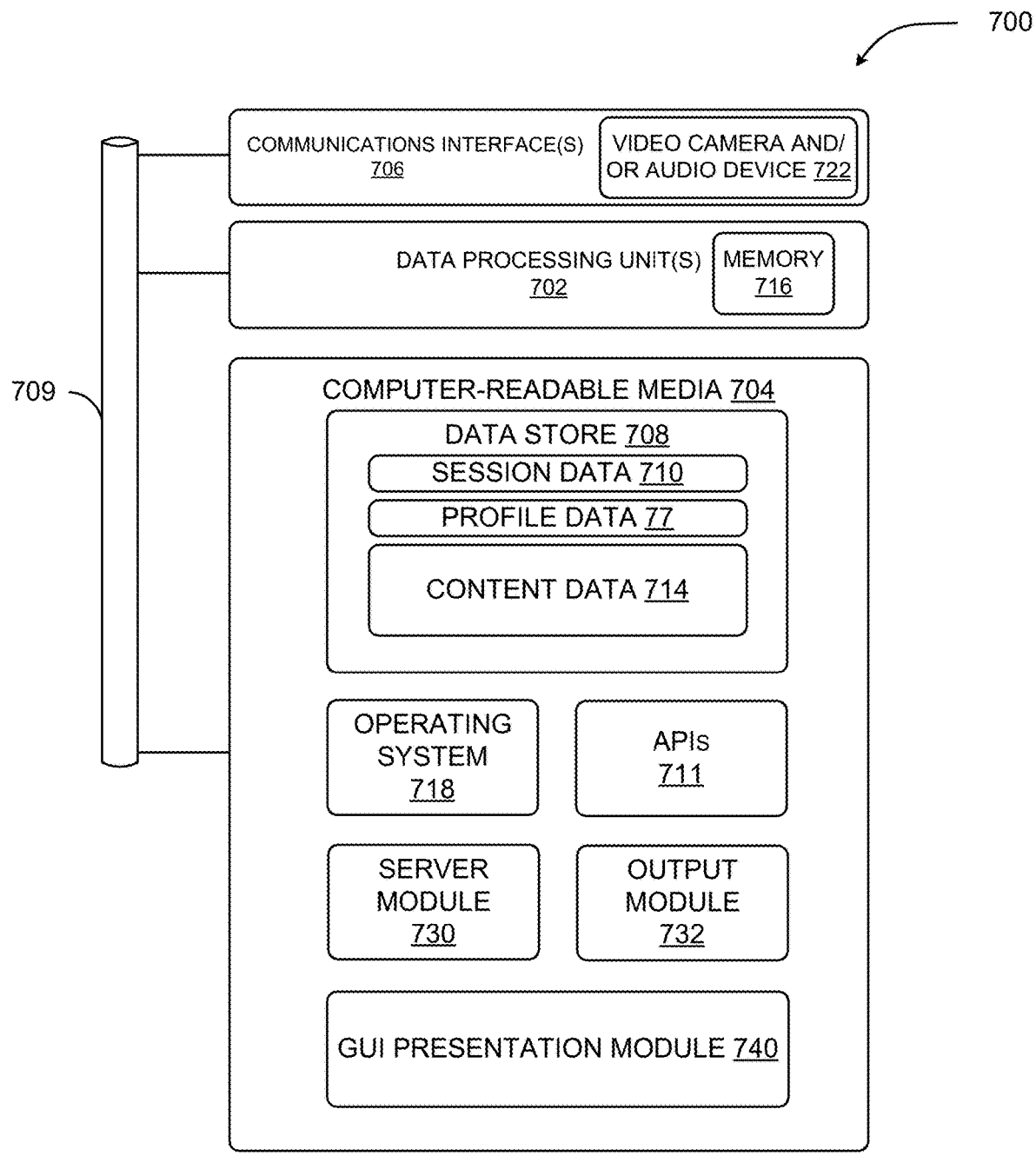
FIG. 7 is a computing architecture diagram showing aspects of the configuration and operation of a computing device that can implement aspects of the technologies disclosed herein.

FIG. 7 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 179. The device 700 may represent one of the device(s) described herein. Additionally, or alternatively, the device 700 may represent one of the client computing devices 1106.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") (not shown in FIG. 7) or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 1136), profile data 77 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include content data 714, such as the content that includes video, audio, or other content for rendering and display on one or more of the display screens 179.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 711 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A machine-implemented method for controlling a data processing system for generating messages associated with a communication session, the method comprising:

causing rendering of a first user interface (UI) for the communication session on a user device, the first UI including a text-based transcription or caption of dialogue being communicated between users of the communication session;

receiving a selection of a portion of the transcription or caption for invoking a messaging function based on the selection;

in response to receiving the selection, invoking the messaging function by automatically causing rendering of, on the user device, a second UI including the selected portion and a message entry area for receiving composed messages, wherein:

the messaging function is separate from functionality providing the text-based transcription or caption, messages generated by the messaging function are not part of the transcription or caption dialogue;

the second UI is separate from the first UI and rendered independently of the first UI; and the second UI renders a session of the messaging function that is associated with the communication session and is operable during the communication session or after the communication session;

receiving an entered message from the message entry area of the second UI; and in response to receiving the entered message:

causing the second UI to include the selected portion along with the entered message; and causing the entered message along with the selected portion to be rendered on a device of a user of the communication session, or a specified recipient of the entered message.

Clause 2: The method of clause 1, further comprising rendering, on the first UI, a UI element including a selectable option for generating the selected portion.

Clause 3: The method of any of clauses 1-2, wherein the UI element is rendered in response to a hover action over the selected portion.

Clause 4: The method of any of clauses 1-3, wherein the selected portion is a single quotation of the transcription or caption.

Clause 5: The method of any of clauses 1-4, wherein the selected portion on the second UI includes an indication that the selection portion is a quotation.

Clause 6: The method of any of clauses 1-5, wherein the communication session is a live session.

Clause 7: The method of clauses 1-6, wherein the communication session is a recorded session.

Clause 8: The method of any of clauses 1-7, wherein the selected portion on the second UI includes a link to the first UI including the selected portion in context of the text-based transcription or caption.

Clause 9: The method of any of clauses 1-8, wherein the selected portion on the first UI includes an indication that the selected portion is associated with a message in the second UI.

Clause 10: The method of any of clauses 1-9, wherein the selected portion is associated with a time stamp indicating a time for the selected portion.

Clause 11: A system, comprising:

one or more data processing units; and a computer-readable medium having encoded thereon computer-executable instructions to cause the one or more data processing units to perform operations comprising:

causing rendering of a first user interface (UI) for a communication session on a user device, the first UI including a text-based transcription or caption of dialogue being communicated between users of the communication session;

receiving a selection of a portion of the transcription or caption for invoking a messaging function based on the selection;

in response to receiving the selection, invoking the messaging function by automatically causing rendering of, on the user device, a second UI including the selected portion and a message entry area for receiving composed messages, wherein:

the messaging function is separate from functionality providing the text-based transcription or caption, messages generated by the messaging function are not part of the transcription or caption dialogue;

the second UI is separate from the first UI and rendered independently of the first UI; and the second UI renders a session of the messaging function that is associated with the communication session and is operable during the communication session or after the communication session;

receiving an entered message from the message entry area of the second UI; and in response to receiving the entered message:

causing the second UI to include the selected portion along with the entered message; and causing the entered message along with the selected portion to be rendered on a device of a user of the communication session, or a specified recipient of the entered message.

Clause 12: The system of clause 11, wherein the communication session is a live session.

Clause 13: The system of any of clauses 11 and 12, wherein the communication session is a recorded session.

Clause 14: The system of any clauses 11-13, wherein the text-based transcription or caption is generated in response to selection of a time within the recorded session.

Clause 15: The system of any clauses 11-14, further comprising computer-executable instructions to cause the one or more data processing units to perform operations comprising rendering, on the first UI, a UI element including a selectable option for generating the selected portion.

Clause 16: A system, comprising:

means for causing rendering of a first user interface (UI) for the communication session on a user device, the first UI including a text-based transcription or caption of dialogue being communicated between users of the communication session;

means for receiving a selection of a portion of the transcription or caption for invoking a messaging function based on the selection;

means for, in response to receiving the selection, invoking the messaging function by automatically causing rendering of, on the user device, a second UI including the selected portion and a message entry area for receiving composed messages, wherein:
the messaging function is separate from functionality providing the text-based transcription or caption,
messages generated by the messaging function are not part of the transcription or caption dialogue;
the second UI is separate from the first UI and rendered independently of the first UI; and
the second UI renders a session of the messaging function that is associated with the communication session and is operable during the communication session or after the communication session;
means for receiving an entered message from the message entry area of the second UI; and
in response to receiving the entered message:
means for causing the second UI to include the selected portion along with the entered message; and
means for causing the entered message along with the selected portion to be rendered on a device of a user of the communication session, or a specified recipient of the entered message.

Clause 17: The system of clause 16, wherein the selected portion is a single quotation of the transcription or caption.

Clause 18: The system of any of clauses 16 and 17, wherein the selected portion on the second UI includes an indication that the selection portion is a quotation.

Clause 19: The system of any of the clauses 16-18, wherein the selected portion on the first UI includes an indication that the selected portion is associated with a message in the second UI.

Clause 20: The system of any of the clauses 16-19, wherein the selected portion on the second UI includes a link to the first UI including the selected portion in context of the text-based transcription or caption.

What is claimed is:

1. A machine-implemented method for controlling a data processing system for generating messages associated with a communication session, the method comprising:
causing rendering of a first user interface (UI) for the communication session on a user device, the first UI including a text-based transcription or caption of dialogue being communicated between users of the communication session;
receiving a selection of a portion of the transcription or caption for invoking a messaging function based on the selection;
in response to receiving the selection, invoking the messaging function by:
automatically extracting the selected portion of the transcription or caption;
automatically causing rendering of, on the user device, a second UI including the selected portion and a message entry area for receiving composed messages, wherein:
the messaging function is separate from functionality providing the text-based transcription or caption,
messages generated by the messaging function are not part of the transcription or caption dialogue; and
the second UI renders a session of the messaging function that is operable during the communication session or during a replay of a recorded version of the communication session;
receiving an entered message from the message entry area of the second UI; and
in response to receiving the entered message:
causing the second UI to include the selected portion along with the entered message; and
causing the entered message along with the selected portion to be rendered on a device of a user of the communication session, or a specified recipient of the entered message.

2. The method of claim 1, further comprising rendering, on the first UI, a UI element including a selectable option for generating the selected portion.

3. The method of claim 2, wherein the UI element is rendered in response to a hover action over the selected portion.

4. The method of claim 1, wherein the selected portion is a single quotation of the transcription or caption.

5. The method of claim 1, wherein the selected portion on the second UI includes an indication that the selection portion is a quotation.

6. The method of claim 1, wherein the communication session is a live session.

7. The method of claim 1, wherein the communication session is a recorded session.

8. The method of claim 1, wherein the selected portion on the second UI includes a link to the first UI including the selected portion in context of the text-based transcription or caption.

9. The method of claim 1, wherein the selected portion on the first UI includes an indication that the selected portion is associated with a message in the second UI.

10. The method of claim 1, wherein the selected portion is associated with a time stamp indicating a time associated with the selected portion.

11. A system, comprising:
one or more data processing units; and
a computer-readable medium having encoded thereon computer-executable instructions to cause the one or more data processing units to perform operations comprising:
causing rendering of a first user interface (UI) for a communication session on a user device, the first UI including a text-based transcription or caption of dialogue being communicated between users of the communication session;
receiving a selection of a portion of the transcription or caption for invoking a messaging function based on the selection;
in response to receiving the selection, invoking the messaging function by:
automatically extracting the selected portion of the transcription or caption;
automatically causing rendering of, on the user device, a second UI including the selected portion and a message entry area for receiving composed messages, wherein:
the messaging function is separate from functionality providing the text-based transcription or caption,
messages generated by the messaging function are not part of the transcription or caption dialogue; and
the second UI renders a session of the messaging function that is operable during the communication session or during a replay of a recorded version of the communication session;
receiving an entered message from the message entry area of the second UI; and in response to receiving the entered message:
  causing the second UI to include the selected portion along with the entered message; and
  causing the entered message along with the selected portion to be rendered on a device of a user of the communication session, or a specified recipient of the entered message.

12. The system of claim 11, wherein the communication session is a live session.

13. The system of claim 11, wherein the communication session is a recorded session.

14. The system of claim 13, wherein the text-based transcription or caption is generated in response to selection of a time within the recorded session.

15. The system of claim 11, further comprising computer-executable instructions to cause the one or more data processing units to perform operations comprising rendering, on the first UI, a UI element including a selectable option for generating the selected portion.

16. A system, comprising:
  means for causing rendering of a first user interface (UI) for a communication session on a user device, the first UI including a text-based transcription or caption of dialogue being communicated between users of the communication session;
  means for receiving a selection of a portion of the transcription or caption for invoking a messaging function based on the selection;
  means for, in response to receiving the selection, invoking the messaging function by:
    automatically extracting the selected portion of the transcription or caption;
    automatically causing rendering of, on the user device, a second UI including the selected portion and a message entry area for receiving composed messages, wherein:
      the messaging function is separate from functionality providing the text-based transcription or caption,
      messages generated by the messaging function are not part of the transcription or caption dialogue; and
      the second UI renders a session of the messaging function that is operable during the communication session or during a replay of a recorded version of the communication session;
  means for receiving an entered message from the message entry area of the second UI; and
  in response to receiving the entered message:
    means for causing the second UI to include the selected portion along with the entered message; and
    means for causing the entered message along with the selected portion to be rendered on a device of a user of the communication session, or a specified recipient of the entered message.

17. The system of claim 16, wherein the selected portion is a single quotation of the transcription or caption.

18. The system of claim 16, wherein the selected portion on the second UI includes an indication that the selection portion is a quotation.

19. The system of claim 16, wherein the selected portion on the first UI includes an indication that the selected portion is associated with a message in the second UI.

20. The system of claim 16, wherein the selected portion on the second UI includes a link to the first UI including the selected portion in context of the text-based transcription or caption.

* * * * *